(12) United States Patent
Sudoh et al.

(10) Patent No.: US 7,636,201 B2
(45) Date of Patent: Dec. 22, 2009

(54) ZOOM LENS AND CAMERA DEVICE INCLUDING THE SAME

(75) Inventors: Yoshifumi Sudoh, Machida (JP);
Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/270,296

(22) Filed: Nov. 13, 2008

(65) Prior Publication Data

US 2009/0135500 A1 May 28, 2009

(30) Foreign Application Priority Data

Nov. 22, 2007 (JP) ............................. 2007-303296

(51) Int. Cl.
*G02B 15/14* (2006.01)
(52) U.S. Cl. ...................... 359/686; 359/676
(58) Field of Classification Search ................ 359/676, 359/686, 683
See application file for complete search history.

(56) References Cited

U.S. PATENT DOCUMENTS

| | | | |
|---|---|---|---|
| 4,639,096 A * | 1/1987 | Kitagishi et al. ............ 359/686 |
| 5,233,454 A | 8/1993 | Sakuma et al. |
| 5,355,244 A | 10/1994 | Suzuki et al. |
| 5,408,095 A | 4/1995 | Atsuumi et al. |
| 5,426,298 A | 6/1995 | Sakuma et al. |
| 5,459,601 A | 10/1995 | Suzuki et al. |
| 5,475,522 A | 12/1995 | Itabashi et al. |
| 5,504,613 A | 4/1996 | Itabashi et al. |
| 5,684,618 A | 11/1997 | Atsuumi |
| 6,078,419 A | 6/2000 | Atsuumi |
| 6,198,563 B1 | 3/2001 | Atsuumi |
| 6,388,792 B1 | 5/2002 | Atsuumi et al. |
| 6,417,509 B1 | 7/2002 | Atsuumi et al. |
| 6,448,998 B1 | 9/2002 | Suzuki et al. |
| 6,449,433 B2 * | 9/2002 | Hagimori et al. .............. 396/72 |
| 6,509,995 B1 | 1/2003 | Suzuki et al. |
| 6,596,985 B2 | 7/2003 | Sakai et al. |
| 6,606,179 B2 | 8/2003 | Suzuki et al. |
| 6,697,183 B2 | 2/2004 | Atsuumi et al. |
| 6,771,407 B2 | 8/2004 | Hayashi et al. |
| 6,781,729 B2 | 8/2004 | Suzuki et al. |

(Continued)

FOREIGN PATENT DOCUMENTS

JP 2005-215165 8/2005

(Continued)

*Primary Examiner*—Scott J Sugarman
*Assistant Examiner*—James R Greece
(74) *Attorney, Agent, or Firm*—Dickstein Shapiro LLP

(57) ABSTRACT

A zoom lens includes a first lens group having a positive focal length, a second lens group having a negative focal length, a third lens group having a positive focal length, a fourth lens group having a negative focal length which are arranged in order from an object side to an image side, and a diaphragm disposed between the second and third lens groups. During a change of zoom ratio from short to long focus end, the first to fourth lens groups move so that an interval between the first and second lens groups increases, an interval between the second and third lens groups decreases, and an interval between the third and fourth lens groups increases. The first lens group includes first and second negative lenses, a reflective optical element, and at least one positive lens arranged in order from the object side to the image side.

12 Claims, 18 Drawing Sheets

U.S. PATENT DOCUMENTS

| | | |
|---|---|---|
| 6,785,028 B1 | 8/2004 | Atsuumi et al. |
| 6,791,729 B2 | 9/2004 | Atsuumi et al. |
| 6,800,845 B2 | 10/2004 | Sakai et al. |
| 6,801,351 B2 | 10/2004 | Suzuki et al. |
| 6,829,104 B2 | 12/2004 | Suzuki et al. |
| 6,937,371 B2 | 8/2005 | Hayashi et al. |
| 6,961,164 B2 | 11/2005 | Atsuumi |
| 6,999,208 B2 | 2/2006 | Suzuki et al. |
| 7,006,120 B2 | 2/2006 | Sakai et al. |
| 7,012,724 B2 | 3/2006 | Atsuumi et al. |
| 7,038,822 B2 | 5/2006 | Sakai et al. |
| 7,050,210 B2 | 5/2006 | Atsuumi et al. |
| 7,106,483 B2 | 9/2006 | Hayashi et al. |
| 7,126,737 B2 | 10/2006 | Atsuumi et al. |
| 7,154,651 B2 | 12/2006 | Atsuumi et al. |
| 7,164,516 B2 | 1/2007 | Hayashi et al. |
| 7,215,354 B1 | 5/2007 | Sakai et al. |
| 7,236,281 B2 | 6/2007 | Hayashi et al. |
| 7,271,823 B2 | 9/2007 | Izumi et al. |
| 7,298,537 B2 | 11/2007 | Hayashi et al. |
| 7,372,636 B2 | 5/2008 | Sudoh |
| 7,373,636 B2 | 5/2008 | Barry |
| 7,397,591 B2 | 7/2008 | Hayashi et al. |
| 2003/0161620 A1* | 8/2003 | Hagimori et al. ............ 396/72 |
| 2003/0214726 A1* | 11/2003 | Mihara .................... 359/676 |
| 2005/0280884 A1 | 12/2005 | Atsuumi et al. |
| 2006/0238845 A1 | 10/2006 | Atsuumi et al. |
| 2007/0206261 A1 | 9/2007 | Hayashi et al. |
| 2007/0247726 A1 | 10/2007 | Sudoh |
| 2008/0218874 A1* | 9/2008 | Take ...................... 359/676 |

FOREIGN PATENT DOCUMENTS

| | | |
|---|---|---|
| JP | 2005-352348 | 12/2005 |
| JP | 2007-3598 | 1/2007 |
| JP | 2007-171456 | 7/2007 |

\* cited by examiner

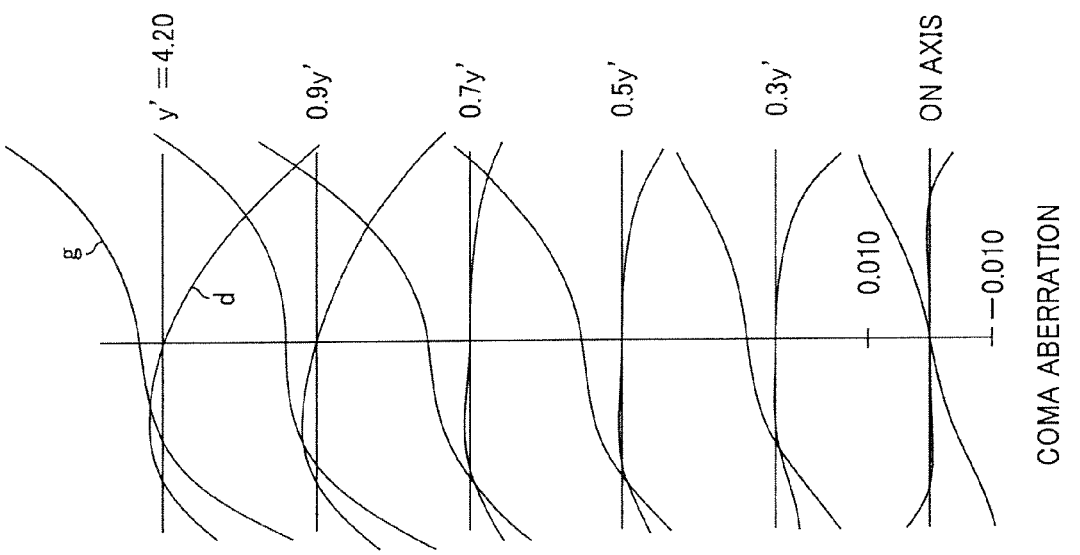
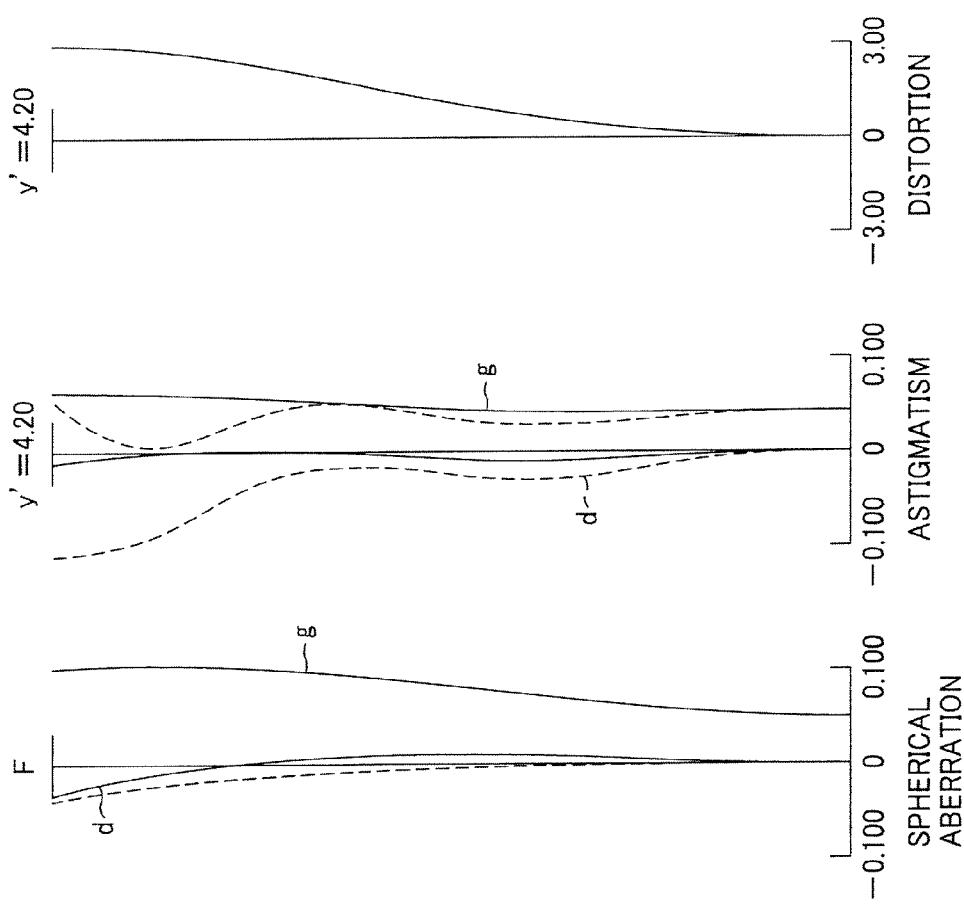
FIG. 12

ZOOM LENS AND CAMERA DEVICE INCLUDING THE SAME

CROSS REFERENCE TO RELATED APPLICATION

The present application is based on and claims priority from Japanese Patent Application No. 2007-303296, filed on Nov. 22, 2007, the disclosure of which is hereby incorporated by reference in its entirety.

BACKGROUND OF THE INVENTION

1. Field of the Invention

The present invention relates to a zoom lens and a camera device including the zoom lens. The zoom lens can be a photographic lens of a digital camera, a mobile terminal, a video camera, or a silver film camera.

2. Description of the Related Art

In recent years, there have been increasing demands of various kinds for digital cameras such as high image quality, downsizing, wider angle, or higher zoom ratio. In order to achieve these, photographic lenses are required to have a zoom ratio of 5 or more, a half field of view of 38 degrees or more, generation of high-quality images adaptable to an image sensor of over 10 million pixels, downsizing, and a larger aperture.

In the prior art, there are compact-size digital cameras which realize thickness reduction of a camera case by including a reflective optical element in a lens system to bend the optical path of an incident light as well as by fixing the first lens group to prevent a change of the outer form of the camera in accordance with zooming operation.

Further, Japanese Laid-open Patent Application Publication No. 2005-215165, No. 2005-352348, No. 2007-171456, and No. 2007-3598 disclose zoom lenses each of which comprise a first lens group with a positive focal length and including a reflective optical element to bend the optical path of an incident light, a second lens group with a negative focal length, a third lens group with a positive focal length, and a fourth lens group with a negative focal length arranged in order from an object side to an image side.

However, there is a drawback in such zoom lenses having four or five lens groups with a positive-negative-positive-negative-positive reflective index distribution and a diaphragm between the second and third lens groups that to aim for a wider angle range, the first and second lens groups arranged closer to the object side than the diaphragm need be in larger size. Also, the reflective optical element in the first lens group need be increased in size.

Further, in order to improve the zoom ratio of the zoom lens, a longer optical path of incident light is needed. From camera designing point of view, the optical path should be bent in a longitudinal direction of an image sensor, which also increases the size of the reflective optical element. Moreover, with an improved zoom ratio, a distance between the reflective optical element and the diaphragm is elongated, which also leads to increasing the size of the reflective optical element. As described above, to increase wide angle range and zoom ratio with the zoom lens with such a configuration, there is a problem that a reflective optical element in a larger size is required.

In the prior art, a single negative lens is disposed on the object side of the reflective optical element for prevention of increasing the size of the reflective optical element. To achieve wider angle range and higher zoom ratio of the zoom lens, this single negative lens is required to properly correct aberration from an off-axial light beam passing through a higher position thereof at the short focus end and an axial marginal light beam passing through a higher position thereof at the long focus end. Also, the negative lens is required to have a large negative power in order to realize downsizing of the zoom lens.

With only one negative lens on the object side of the reflective optical element, it is extremely difficult to achieve a large negative power and proper aberration correction of the off-axial light beam and the axial marginal light beam at the same time, as well as increase in the zoom ratio and half the field of view.

Japanese Laid-open Patent Application Publication No. 2005-215165 discloses a variable zoom lens with a high zoom ratio of 7 or more. However, it fails to realize a wide angle range with half the field of view of 38 degrees or more at short focus end. Japanese Laid-open Patent Application Publication No. 2005-352348 discloses a wide angle, high zoom ratio zoom lens with a zoom ratio of about 35 and half the field of view of 38 degrees or more, however, it is not compact enough in size and has a very large distortion so that it cannot achieve good optical performance. Japanese Laid-open Patent Application Publication No. 2007-171456 discloses a variable zoom lens with a zoom ratio of 7 and half the field of view of 38 degrees or more at short focus end. However, it causes a difficulty in camera layout since a reflective optical element is configured to bend an optical path of incident light in a short side direction of an image sensor. A zoom lens disclosed in Japanese Laid-open Patent Application Publication No. 2007-3598 cannot achieve half the field of view of 38 degrees or more and zoom ratio of 5 or more at the short focus end.

SUMMARY OF THE INVENTION

In view of solving the above problems, the present invention aims to provide a compact size zoom lens which achieves half the field of view of 38 degrees or more and zoom ratio of 5 or more at short focus end and provide a camera device including the zoom lens.

According to one aspect of the present invention, a zoom lens comprises a first lens group having a positive focal length, a second lens group having a negative focal length, a third lens group having a positive focal length, a fourth lens group having a negative focal length, and a diaphragm disposed between the second and third lens groups, the first to fourth lens groups arranged in order from an object side to an image side, wherein during a change of zoom ratio from a short focus end to a long focus end, the first to fourth lens groups are configured to move so that an interval between the first and second lens groups increases, an interval between the second and third lens groups decreases, and an interval between the third and fourth lens groups increases; and the first lens group comprises a first negative lens, a second negative lens, a reflective optical element, and at least one positive lens arranged in order from the object side to the image side; the reflective optical element is configured to bend an optical path of an incident light beam in the first lens group.

In features of this aspect, the zoom lens further comprises a fifth lens group on the image side of the fourth lens group and having a positive focal length.

In other features of this aspect, the first negative lens of the first lens group closest to an object is a negative meniscus lens with a convex face on the object side, In other features of this aspect, the negative meniscus lens of the first lens group is configured to have such a lens characteristic as to satisfy the following condition (1):

$$0.2 < rI2/rI1 < 0.8$$

where rI1 denotes a curvature radius of an object side face of the negative meniscus lens and rI2 denotes a curvature radius of an image side face thereof, In other features of this aspect, the first lens group comprises two positive lenses on the image side of the reflective optical element.

In other features of this aspect, the first and second negative lenses of the first lens group are configured to have such a lens characteristic as to satisfy the following condition (2):

$$2.0 < |fI12|/fw < 6.0$$

where fI12 denotes a combined focal length of the two negative lenses and fw denotes a total focal length of all of the lens groups at the short focus end.

In other features of this aspect, the first and second negative lenses of the first lens group are configured to have such a lens characteristic as to satisfy the following condition (3):

$$0.05 < fI1/fI2 < 0.8$$

where fI1 denotes a focal length of the first negative lens on the object side and fI2 denotes that of the second negative lens on the image side.

In other features of this aspect, the first negative lens of the first lens group closer to the image side is a negative meniscus lens with a convex face on the object side.

In other features of this aspect, the fifth lens group is fixed in a change of zoom ratio.

In other features of this aspect, a zoom ratio of the zoom lens is 5 or more and a half field of view thereof is 38 degrees or more at the short focus end.

According to another aspect of the present invention, a camera device comprises the above-described zoom lens as a photographic lens.

In features of this aspect, the camera device further comprises a function to convert a captured image into digital data.

BRIEF DESCRIPTION OF THE DRAWINGS

FIG. 12 shows aberration curves in the intermediate focal length of the zoom lens 10 according to the third embodiment;

DETAILED DESCRIPTION OF THE PREFERRED EMBODIMENTS

Hereinafter, embodiments of the present invention will be described in detail with reference to the accompanying drawings.

First Embodiment

Figure 1:
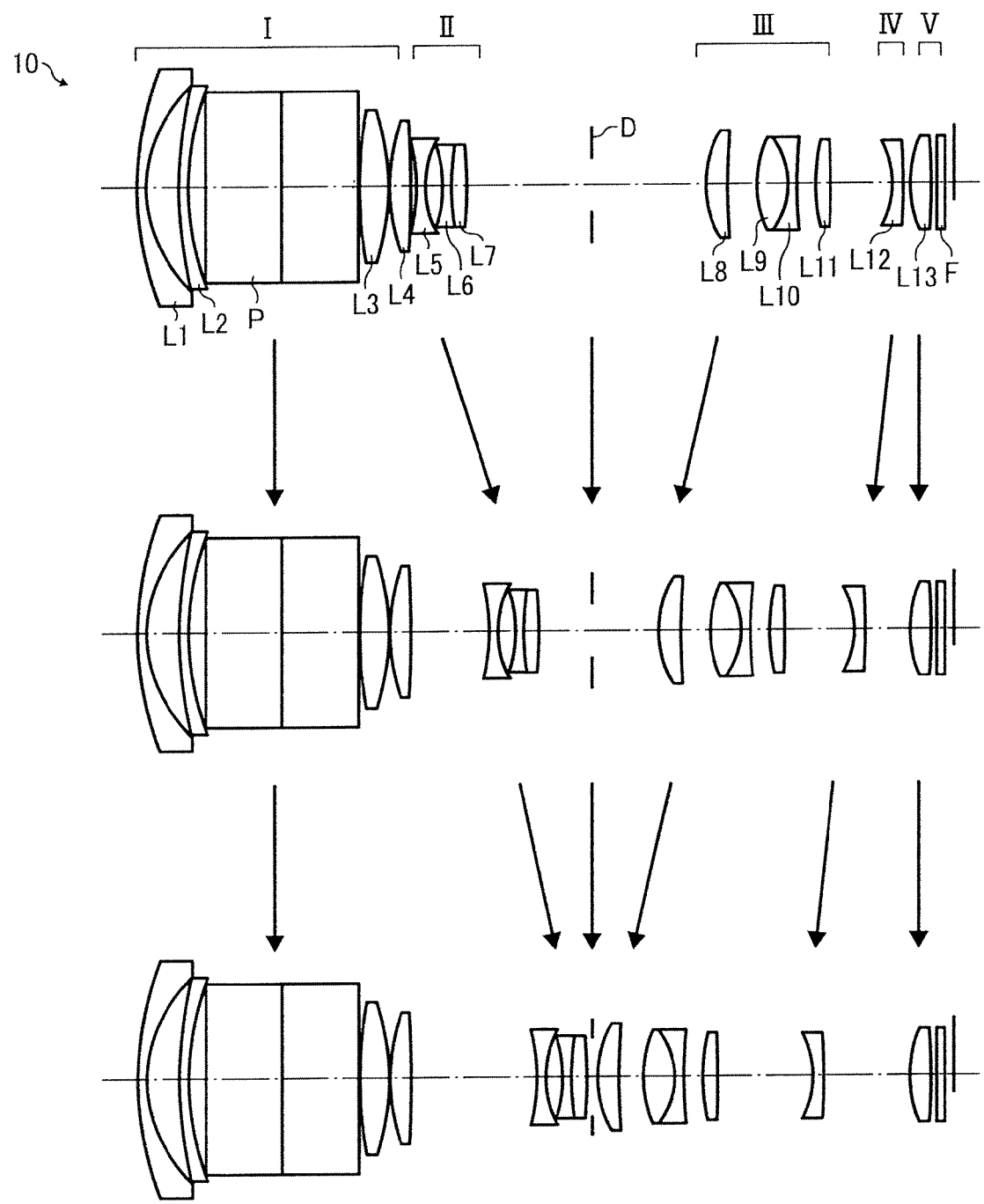
FIG. 1 shows an optical arrangement of a zoom lens 10 according to a first embodiment.

FIG. 1 shows lens arrangements of a zoom lens 10 according to the first embodiment of the present invention. As shown in FIG. 1, from an object side (left side in the drawing) to an image side, the zoom lens 10 comprises a first lens group I having a positive focal length, a second lens group II having a negative focal length, a diaphragm D, a third lens group III having a positive focal length, a fourth lens group IV having a negative focal length, a fifth lens group V having a positive focal length, and a filter F. The top of FIG. 1 shows the zoom lens 10 at short focus end, the middle thereof shows the zoom lens 10 in intermediate focal length, and the bottom thereof shows the zoom lens 10 at long focus end (telephoto end). Arrows indicate movement of the lens groups from the short focus end to the long focus end in a change of zoom ratio. In the change of zoom ratio from the short focus end to the long focus end, the first to fourth lens groups I to IV move so that an interval between the first and second lens groups I, II increases, an interval between the second and third lens II, III groups decreases, and an interval between the third and fourth lens groups III, IV increases. The fifth lens group V is fixed during the change of zoom ratio. It is preferable that focusing is done by moving the fourth lens group IV.

The first lens group I is configured to include first and second negative lenses, a reflective optical element P, at least one positive lens arranged in this order from the object side to the image side. The reflective optical element P is a prism to bend an optical path of an incident light beam in the first lens group I.

Preferably, the first lens group I is configured to include two positive lenses on the image side of the reflective optical element P. The first and second negative lenses of the first lens group I are negative meniscus lenses with convex faces on the object side.

Second Embodiment

Figure 2:
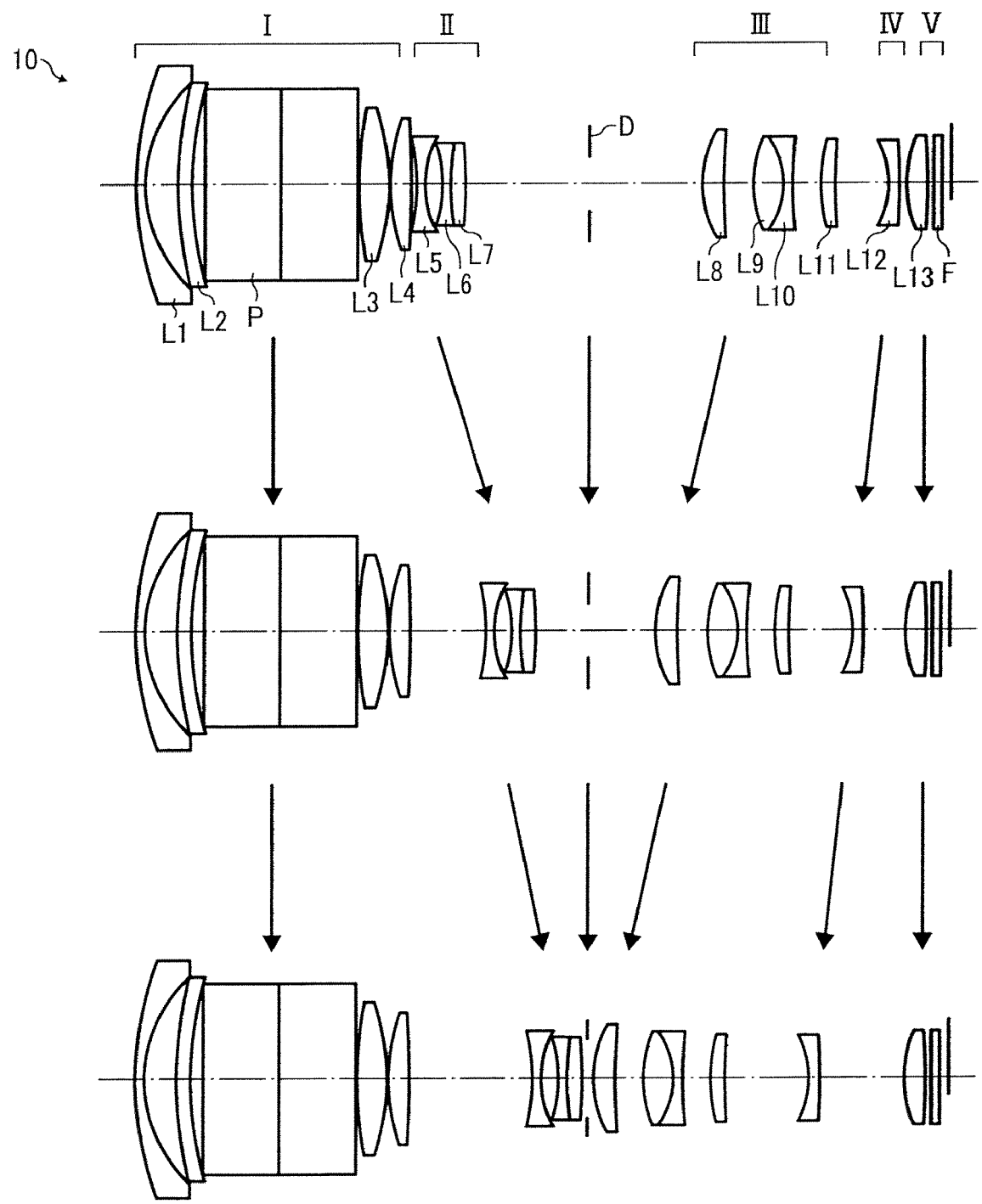
FIG. 2 shows an optical arrangement of the zoom lens 10 according to a second embodiment.

FIG. 2 shows lens arrangements of a zoom lens 10 according to the second embodiment of the present invention. As shown in FIG. 2, from an object side (left side in the drawing) to an image side, the zoom lens 10 comprises a first lens group I having a positive focal length, a second lens group II having a negative focal length, a diaphragm D, a third lens group III having a positive focal length, a fourth lens group IV having a negative focal length, a fifth lens group V having a positive focal length, and a filter F. The top of FIG. 1 shows the zoom lens 10 at short focus end, the middle thereof shows the zoom lens 10 in intermediate focal length, and the bottom thereof shows the zoom lens 10 at long focus end (telephoto end). Arrows indicate movement of the lens groups from the short focus end to the long focus end in a change of zoom ratio. In the change of zoom ratio from the short focus end to the long focus end, the first to fourth lens groups I to IV move so that an interval between the first and second lens groups I, II increases, an interval between the second and third lens II, III groups decreases, and an interval between the third and fourth lens groups III, IV increases. The fifth lens group V is fixed during the change of zoom ratio. It is preferable that focusing is done by moving the fourth lens group IV.

The first lens group I is configured to include first and second negative lenses, a reflective optical element P, at least one positive lens arranged in this order from the object side to the image side. The reflective optical element P is a prism to bend an optical path of an incident light beam in the first lens group I.

Preferably, the first lens group I is configured to include two positive lenses on the image side of the reflective optical element P. The first and second negative lenses of the first lens group I are negative meniscus lenses with convex faces on the object side.

Third Embodiment

Figure 3:
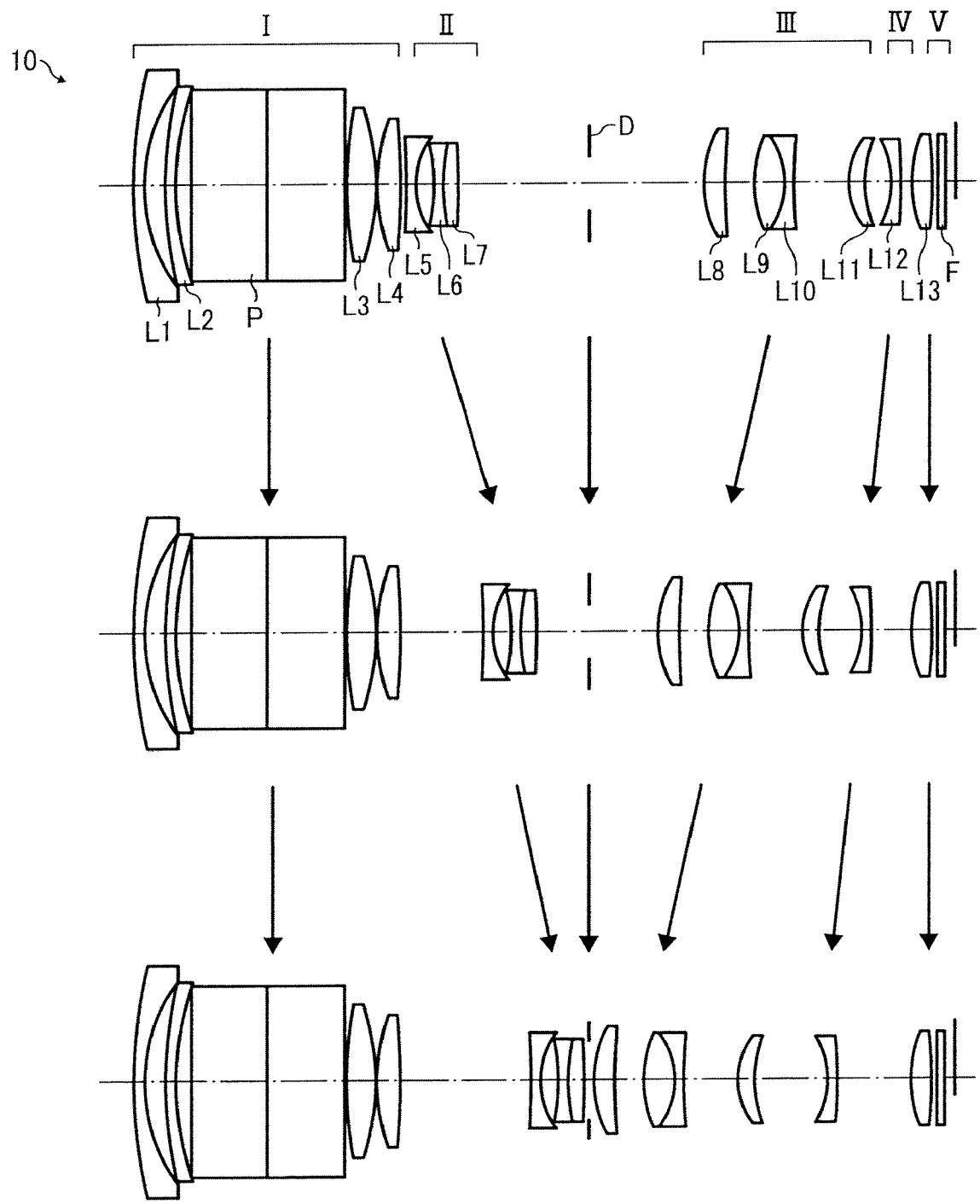
FIG. 3 shows an optical arrangement of the zoom lens 10 according to a third embodiment.

FIG. 3 shows lens arrangements of a zoom lens 10 according to the third embodiment of the present invention. As shown in FIG. 3, from an object side (left side in the drawing) to an image side, the zoom lens 10 comprises a first lens group I having a positive focal length, a second lens group II having a negative focal length, a diaphragm D, a third lens group III having a positive focal length, a fourth lens group IV having a negative focal length, a fifth lens group V having a positive focal length, and a filter F. The top of FIG. 1 shows the zoom lens 10 at short focus end, the middle thereof shows the zoom lens 10 in intermediate focal length, and the bottom thereof shows the zoom lens 10 at long focus end (telephoto end). Arrows indicate movement of the lens groups from the short focus end to the long focus end in a change of zoom ratio. In the change of zoom ratio from the short focus end to the long focus end, the first to fourth lens groups I to IV move so that an interval between the first and second lens groups I, II increases, an interval between the second and third lens II, III groups decreases, and an interval between the third and fourth lens groups III, IV increases. The fifth lens group V is fixed during the change of zoom ratio. It is preferable that focusing is done by moving the fourth lens group IV.

The first lens group I is configured to include first and second negative lenses L1, L2, a reflective optical element P, at least one positive lens arranged in this order from the object side to the image side. The reflective optical element P is a prism to bend an optical path of an incident light beam in the first lens group I.

Preferably, the first lens group I is configured to include two positive lenses on the image side of the reflective optical element P. The first and second negative lenses of the first lens group I are negative meniscus lenses with convex faces on the object side.

Fourth Embodiment

Figure 4:
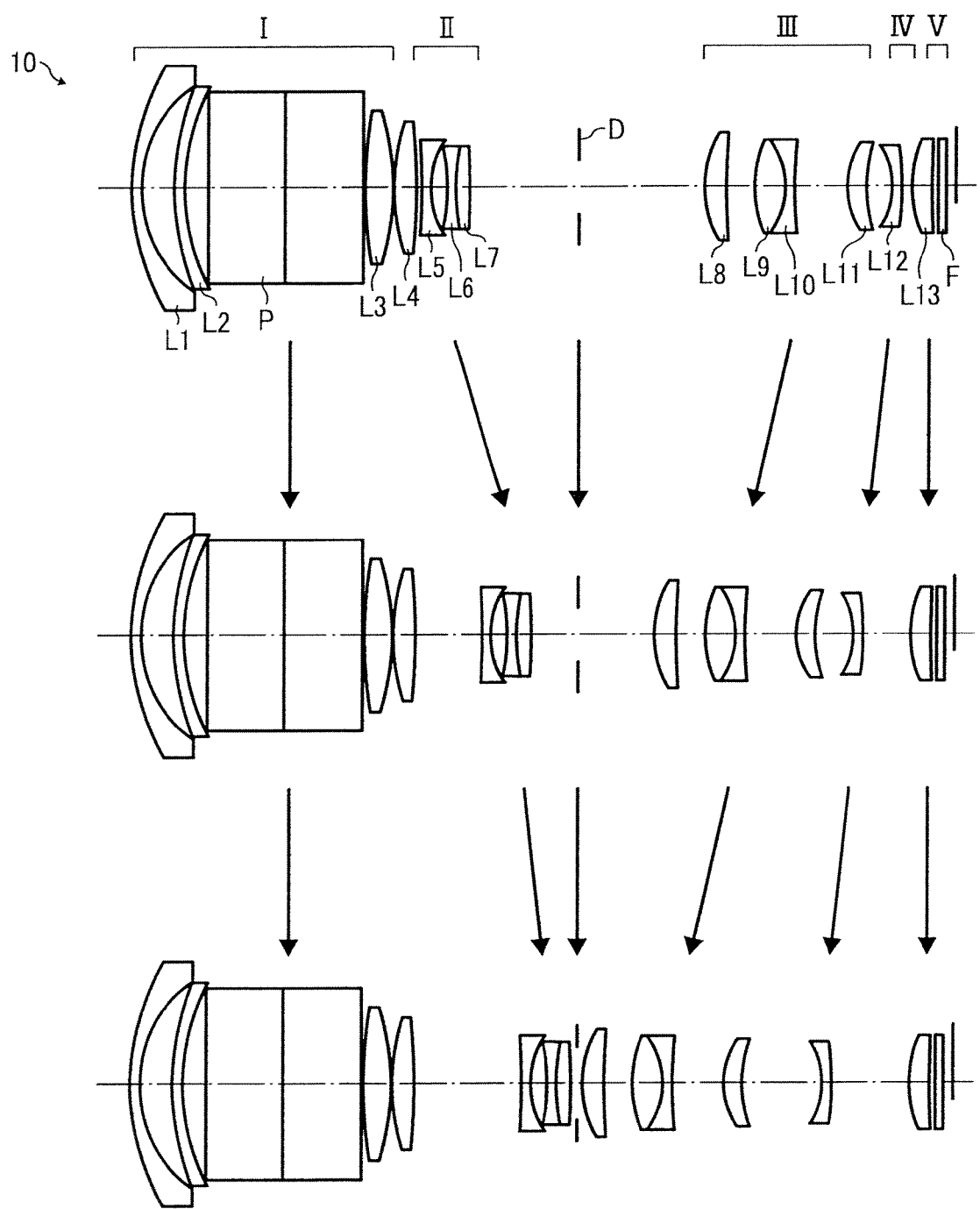
FIG. 4 shows an optical arrangement of the zoom lens 10 according to a fourth embodiment.

FIG. 4 shows lens arrangements of a zoom lens 10 according to the fourth embodiment of the present invention. As shown in FIG. 4, from an object side (left side in the drawing) to an image side, the zoom lens 10 comprises a first lens group I having a positive focal length, a second lens group II having a negative focal length, a diaphragm D, a third lens group III having a positive focal length, a fourth lens group IV having a negative focal length, a fifth lens group V having a positive focal length, and a filter F. The top of FIG. 1 shows the zoom lens 10 at short focus end, the middle thereof shows the zoom lens 10 in intermediate focal length, and the bottom thereof shows the zoom lens 10 at long focus end (telephoto end). Arrows indicate movement of the lens groups from the short focus end to the long focus end in a change of zoom ratio. In the change of zoom ratio from the short focus end to the long focus end, the first to fourth lens groups I to IV move so that an interval between the first and second lens groups I, II increases, an interval between the second and third lens II, III groups decreases, and an interval between the third and fourth lens groups III, IV increases. The fifth lens group V is fixed during the change of zoom ratio. It is preferable that focusing is done by moving the fourth lens group IV.

The first lens group I is configured to include first and second negative lenses, a reflective optical element P, at least one positive lens arranged in this order from the object side to the image side. The reflective optical element P is a prism to bend an optical path of an incident light beam in the first lens group I.

Preferably, the first lens group I is configured to include two positive lenses on the image side of the reflective optical element P. The first and second negative lenses of the first lens group I are negative meniscus lenses with convex faces on the object side.

As described above, the zoom lens 10 according to the first to fourth embodiments can achieve a zoom ratio of 5 or more and half the field of view of 38 degrees or more at the short focus end, which will be described later in the first to fourth examples.

Fifth Embodiment

Figure 17A:
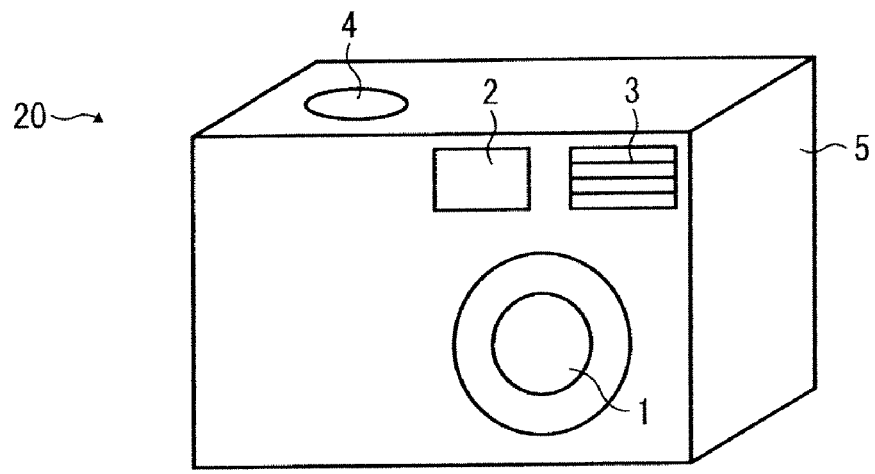
FIGS. 17A and 17B show an example of a camera device 20 including the zoom lens 10 according to the present invention.
Figure 17B:
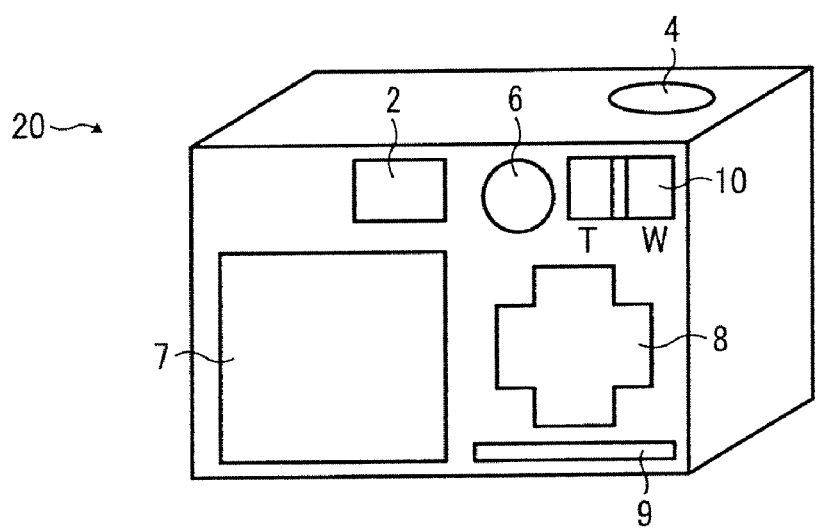

FIG. 17A shows the front face and top face of a camera device 20 according to the present invention and FIG. 17B shows the back face thereof.

The camera device 20 comprises a photographic lens 1 as the zoom lens according to any one of the first to fourth embodiments of the present invention, a viewfinder 2, a stroboscopic lamp 3, a shutter button 4, a power switch 6, a liquid crystal display 7, an operation button 8, a slot 9, and a zoom lever 10.

Figure 18:
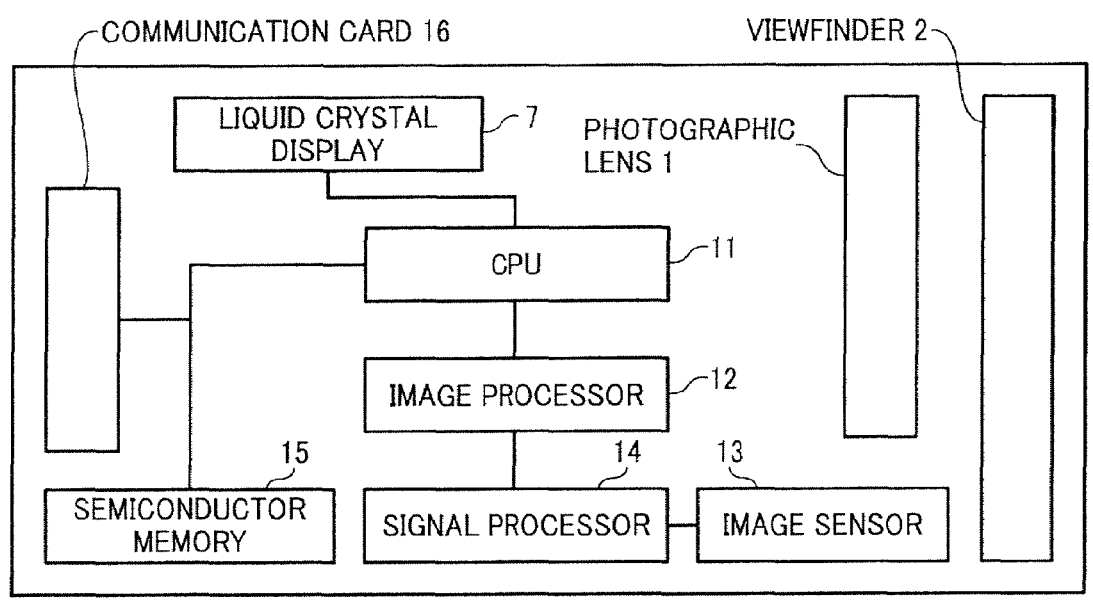
FIG. 18 shows a system configuration of the camera device 20 of FIG. 17.

FIG. 18 shows the system configuration of the camera device 20 of FIG. 17. The camera device 20 is configured to include a color image sensor 13 (area sensor) which reads an object image formed thereon by the photographic lens 1. The image sensor 13 can be a CCD area sensor with a diagonal length of a light receiving area of 9.1 mm, a pixel pitch of 2 µm, number of pixels in 10 million or more, for example.

As shown in FIG. 18, under the control of a central processing unit 11, outputs from the image sensor 13 are processed and converted into digital data by a signal processor 14 and the digital data is subjected to a predetermined image processing by an image processor 12. The processed data is stored in a semiconductor memory 15. The liquid crystal display 7 is provided to display a captured image during shooting or an image recorded in the semiconductor memory 15. Images in the semiconductor memory 15 can be transmitted to outside via a communication card 16 or the like. The image display and data transmission to the outside is done via the operation button 8 (FIG. 17). The semiconductor memory 15 and communication card 16 are inserted into a designated or general slot 9.

In the photographic lens 1 as the zoom lens according to the present invention, the optical path is bent by the prism of the first lens group in a casing of the camera. Also, the first lens group I is fixed during a change of zoom ratio, the outer form of the camera does not change at all by zoom ratio changing operation.

Hereinafter, examples of the zoom lens 10 will be described. Numeral codes and symbols used hereinafter denote as follows:

Si: i-th lens face from the object side
f: total focal length of lens system
F: F-number
ω: half field of angle (degree)
Ri; curvature radius of i-th lens face from the object side
Di: interval between i-th lens face and i+1$^{th}$ lens face on the axis
Ni: refractive index
vi: Abbe number
K: conic constant of aspheric surface
A4: fourth order aspheric coefficient
A6: sixth order aspheric coefficient
A8: eighth order aspheric coefficient
A10: tenth order aspheric coefficient The aspheric surface is expressed by the following known formula:

$$X = CH^2/[1+\sqrt{(1-(1+K)C^2H^2)}] + A4 \cdot H^4 + A6 \cdot H^6 + A8 \cdot H^8 + A10 \cdot H^{10}$$

where C is paraxial curvature (inverse of paraxial curvature radius), H is height from the optical axis, K is conic constant, and A4 to A10 are high-order aspheric coefficients.

FIRST EXAMPLE

FIG. 1 shows configuration of the zoom lens 10 according to the first embodiment and how the respective lens groups move in accordance with a change of zoom ratio. In FIG. 1, L1 represents a first lens, L2 represents a second lens, L3 represents a third lens, L4 represents a fourth lens, L5 represents a fifth lens, L6 represents a sixth lens, L7 represents a seventh lens, L8 represents an eighth lens, L9 represents a ninth lens, L10 represents a 10$^{th}$ lens, L11 represents an 11$^{th}$ lens, L12 represents a 12$^{th}$ lens, and L13 represents a 13$^{th}$ lens.

The following table 1 shows specific data on the first to 13$^{th}$ lenses L1 to L13 of the first to fifth lens groups I to V.

TABLE 1

| Si | Ri | Di | Ni | vi | GLASS |
|---|---|---|---|---|---|
| 1 | 30.106 | 0.96 | 1.90200 | 25.10 | LNBH54(OHARA) |
| 2* | 13.000 | 3.26 | | | |
| 3 | 42.873 | 1.01 | 1.80518 | 25.42 | STIH6(OHARA) |
| 4 | 29.178 | 1.76 | | | |
| 5 | ∞ | 7.90 | 1.88300 | 40.76 | SLAH58(OHARA) |
| 6 | ∞ | 7.90 | 1.88300 | 40.76 | SLAH58(OHARA) |
| 7 | ∞ | 0.20 | | | |
| 8 | 40.688 | 2.63 | 1.49700 | 81.54 | SFPL51(OHARA) |
| 9 | −28.682 | 0.19 | | | |
| 10 | 19.562 | 2.28 | 1.51633 | 64.14 | SBSL7(OHARA) |
| 11 | −135.413 | VARIABLE(A) | | | |
| 12 | −24.547 | 0.99 | 1.80610 | 40.88 | LLAH53(OHARA) |
| 13* | 10.537 | 1.48 | | | |
| 14 | −14.084 | 1.00 | 1.49700 | 81.54 | SFPL51(OHARA) |
| 15 | 15.317 | 1.68 | 1.84666 | 23.78 | STIH53(OHARA) |
| 16 | −41.224 | VARIABLE(B) | | | |
| 17 | (DIAPHGRAM) | VARIABLE(C) | | | |
| 18* | 10.000 | 2.24 | 1.73077 | 40.51 | LLAM69(OHARA) |
| 19 | 68.961 | 3.02 | | | |
| 20 | 12.000 | 3.09 | 1.48749 | 70.24 | SFSL5(OHARA) |
| 21 | −7.200 | 1.00 | 1.84666 | 23.78 | STIH53(OHARA) |
| 22 | 64.764 | 1.91 | | | |
| 23 | 22.185 | 1.45 | 1.55880 | 62.56 | LPHL2(OHARA) |
| 24* | −116.432 | VARIABLE(D) | | | |
| 25* | −10.001 | 1.04 | 1.67790 | 54.89 | LLAL12(OHARA) |
| 26 | −101.574 | VARIABLE(E) | | | |
| 27* | 14.964 | 2.16 | 1.51633 | 64.06 | LBSL7(OHARA) |
| 28 | −58.923 | 0.50 | | | |
| 29 | ∞ | 0.80 | 1.50863 | 64.00 | FILTER OR THE LIKE |
| 30 | ∞ | | | | |

In the table 1, asterisk indicates that surface is aspheric.

| | Aspheric coefficients | | | |
|---|---|---|---|---|
| 2 | $A4 = -1.96504E^{-5}$ | $A6 = -1.76184E^{-7}$ | $A8 = 1.20812E^{-9}$ | $A10 = -1.64015E^{-11}$ |
| 13 | $A4 = -5.19414E^{-5}$ | $A6 = 8.98645E^{-7}$ | $A8 = -5.82646E^{-8}$ | $A10 = 2.25839E^{-9}$ |
| 18 | $A4 = 1.06267E^{-5}$ | $A6 = 1.09962E^{-6}$ | $A8 = -1.35515E^{-8}$ | $A10 = 5.15100E^{-10}$ |
| 24 | $A4 = 2.13222E^{-4}$ | $A6 = -2.44438E^{-06}$ | $A8 = 7.08665E^{-8}$ | $A10 = -3.75169E^{-9}$ |
| 25 | $A4 = -1.24035E^{-4}$ | $A6 = -3.25343E^{-5}$ | $A8 = 1.44226E^{-6}$ | $A10 = -5.95727E^{-8}$ |
| 27 | $A4 = -1.31582E^{-4}$ | $A6 = 1.12946E^{-5}$ | $A8 = 4.64622E^{-7}$ | $A10 = -1.01121E^{-8}$ |

Table 2 shows variable interval data A to E during a change of zoom ratio according to the first embodiment. During the change of zoom ratio, the interval D11(A) on the axis between the first and second lens groups I, II, that D16(B) between the second lens group II and the diaphragm D, that D17 (C) between the diaphragm D and the third lens group III, that D24 (D) between the third and fourth lens groups III, IV, and that D26(E) between the fourth and fifth lens groups IV, V are variable,

TABLE 2

| | Wide | Mean | Tele |
|---|---|---|---|
| f | 5.20 | 13.49 | 35.00 |
| F-value | 3.45 | 4.91 | 5.35 |
| ω | 40.40 | 16.84 | 6.81 |
| A | 0.53 | 8.14 | 12.95 |
| B | 12.92 | 5.31 | 0.50 |
| C | 11.67 | 7.06 | 0.51 |
| D | 6.50 | 7.41 | 9.74 |
| E | 0.79 | 4.49 | 8.71 |

Diaphragm diameter Wide: 2.5 mm Mean: 2.5 mm Tele: 3.8 mm

In the table 2 Wide denotes short focus end, Mean denotes an intermediate focal length, and Tele denotes a long focus end. The unit of the values is mm.

The zoom lens 10 according to the first embodiment of the present invention is configured to satisfy the following conditions (1) to (3):

$$0.2 < rI2/rI1 < 0.8 \quad (1)$$

$$2.0 < |fI12|/fw < 6.0 \quad (2)$$

$$0.05 < fI1/fI2 < 0.8 \quad (3)$$

where rI1 denotes a curvature radius of an object side face of the negative meniscus lens of the first lens group I and rI2 denotes a curvature radius of an image side face thereof, fI12 denotes a combined focal length of the two negative lenses of the first lens group I and fw denotes a total focal length of all of the lens groups at the short focus end, and fI1 denotes a focal length of the first negative lens on the object side and fI2 denotes that of the second negative lens on the image side.

Values of respective parameters in the conditions (1) to (3) are as follows:

fI12=−20.649
fI1=−26.059
fI2=−117.303
rI2/rI1=0.319
|fI12|/fw=3.848
fI1/fI2=0.276

Figure 5:
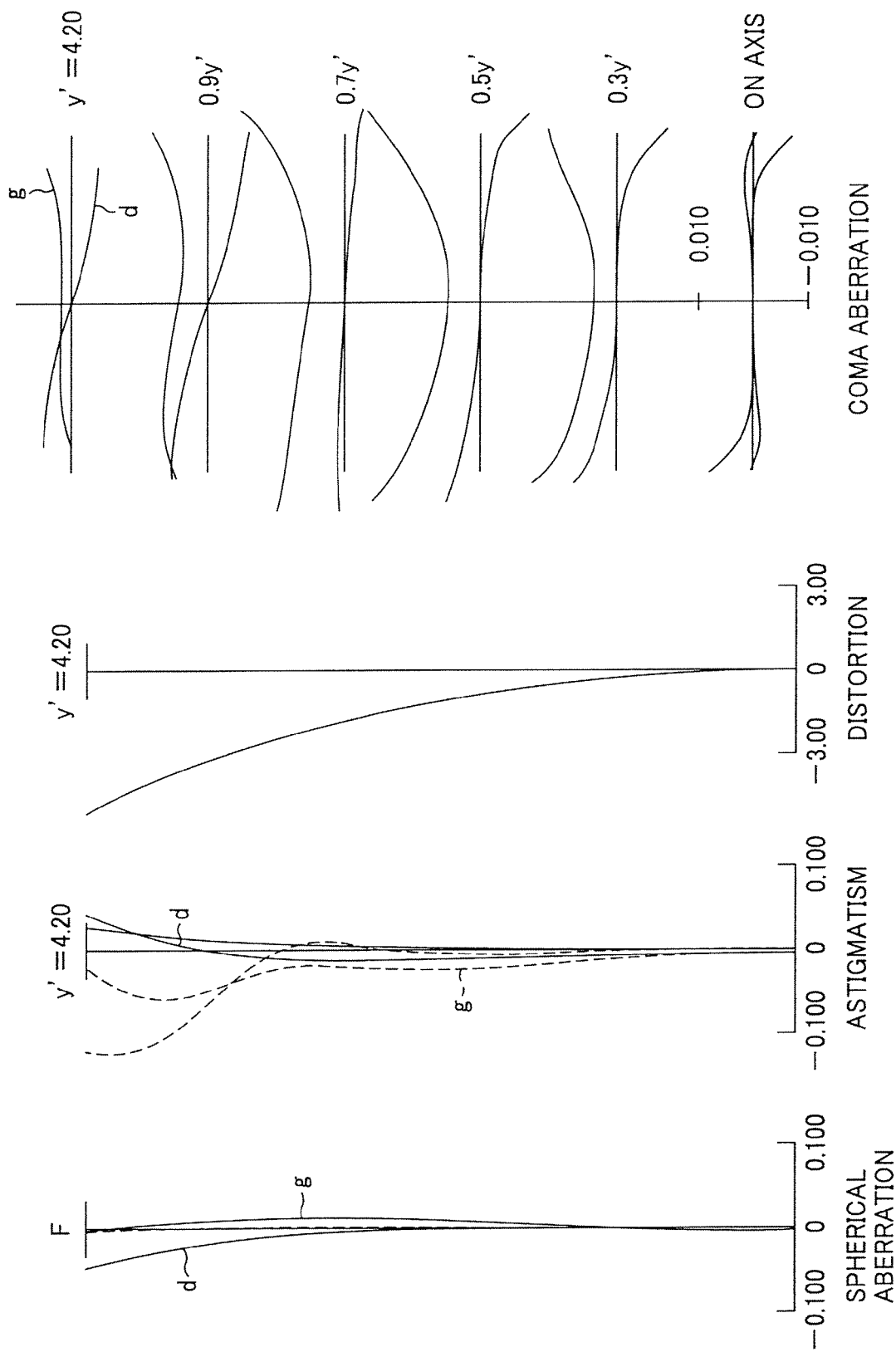
FIG. 5 shows aberration curves at the short focus end of the zoom lens 10 according to the first embodiment.
Figure 6:
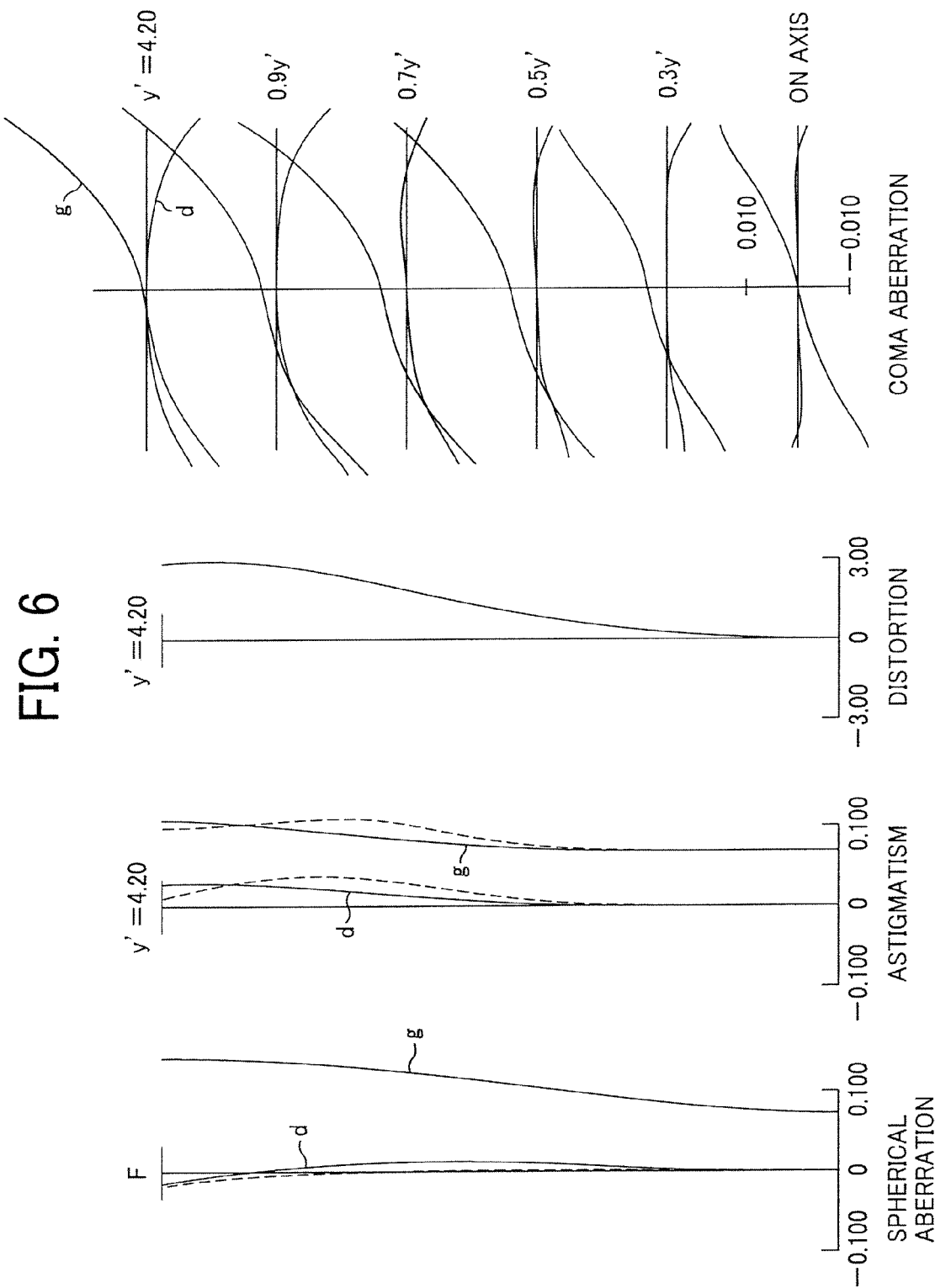
FIG. 6 shows aberration curves in the intermediate focal length of the zoom lens 10 according to the first embodiment.
Figure 7:
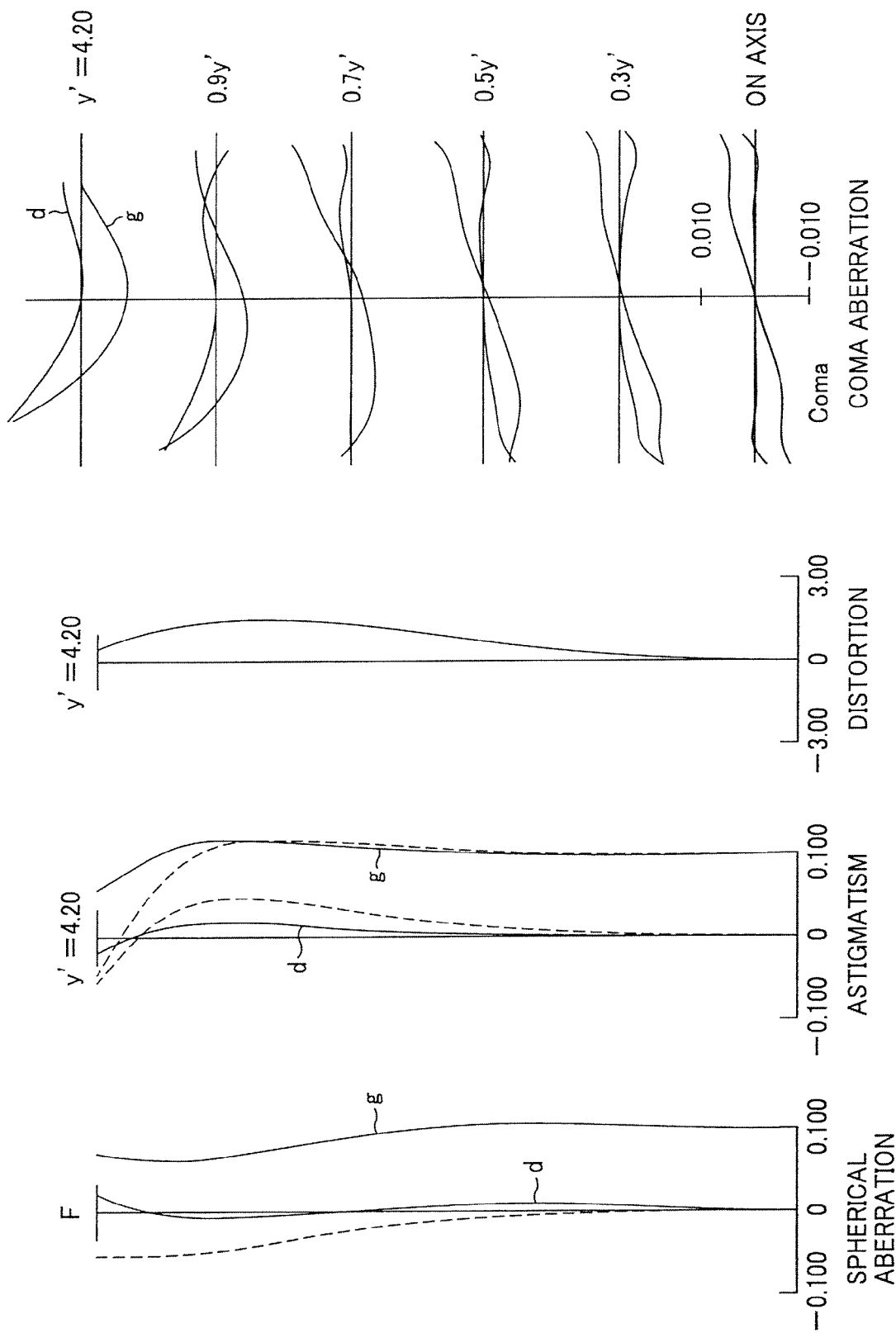
FIG. 7 shows aberration curves at the long focus end of the zoom lens 10 according to the first embodiment.

FIGS. 5 to 7 show aberrations of the zoom lens 10 according to the first embodiment at the short focus end, in the intermediate focal length, and at the long focus end, respectively. In the drawings, d denotes a D line and g denotes a G line. In the spherical aberration, the broken line indicates sine condition, and in the astigmatism, the solid line indicates sagittal image plane and the broken line indicates meridional image plane.

SECOND EXAMPLE

FIG. 2 shows configuration of the zoom lens 10 according to the second embodiment and how the respective lens groups move in accordance with a change of zoom ratio. In FIG. 2, L1 represents a first lens, L2 represents a second lens, L3 represents a third lens, L4 represents a fourth lens, L5 represents a fifth lens, L6 represents a sixth lens, L7 represents a seventh lens, L8 represents an eighth lens, L9 represents a ninth lens, L10 represents a $10^{th}$ lens, L11 represents an $11^{th}$ lens, L12 represents a $12^{th}$ lens, and L13 represents a $13^{th}$ lens.

The following table 3 shows specific data on the first to $13^{th}$ lenses L1 to L13 of the first to fifth lens groups I to V.

TABLE 3

| Si | Ri | Di | Ni | vi | GLASS |
|---|---|---|---|---|---|
| 1 | 40.000 | 1.00 | 1.90200 | 25.10 | LNBH54(OHARA) |
| 2* | 13.405 | 2.97 | | | |
| 3 | 42.873 | 1.39 | 1.80518 | 25.42 | STIH6(OHARA) |
| 4 | 34.615 | 1.49 | | | |
| 5 | ∞ | 7.90 | 1.88300 | 40.76 | SLAH58(OHARA) |
| 6 | ∞ | 7.90 | 1.88300 | 40.76 | SLAH58(OHARA) |
| 7 | ∞ | 0.20 | | | |
| 8 | 45.826 | 2.62 | 1.49700 | 81.54 | SFPL51(OHARA) |
| 9 | −28.717 | 0.20 | | | |
| 10 | 18.726 | 2.31 | 1.51633 | 64.14 | SBSL7(OHARA) |
| 11 | −226.391 | VARIABLE(A) | | | |
| 12 | −25.267 | 1.00 | 1.80610 | 40.88 | LLAH53(OHARA) |
| 13* | 10.699 | 1.52 | | | |
| 14 | −14.247 | 1.00 | 1.49700 | 81.54 | SFPL51(OHARA) |
| 15 | 15.959 | 1.70 | 1.84666 | 23.78 | STIH53(OHARA) |
| 16 | −37.302 | VARIABLE(B) | | | |

TABLE 3-continued

| Si | Ri | Di | Ni | vi | GLASS |
|---|---|---|---|---|---|
| 17 | (DIAPHGRAM) | VARIABLE(C) | | | |
| 18* | 10.037 | 2.30 | 1.73077 | 40.51 | LLAM69(OHARA) |
| 19 | 71.064 | 2.98 | | | |
| 20 | 12.011 | 3.10 | 1.48749 | 70.24 | SFSL5(OHARA) |
| 21 | −7.200 | 1.34 | 1.84666 | 23.78 | STIH53(OHARA) |
| 22 | 50.634 | 2.59 | | | |
| 23 | 13.835 | 1.61 | 1.51633 | 64.06 | LBSL7(OHARA) |
| 24* | 89.729 | VARIABLE(D) | | | |
| 25* | −9.999 | 1.00 | 1.73077 | 40.51 | LLAM69(OHARA) |
| 26 | 1218.978 | VARIABLE(E) | | | |
| 27* | 14.995 | 2.23 | 1.51633 | 64.06 | LBSL7(OHARA) |
| 28 | −50.017 | 0.50 | | | |
| 29 | ∞ | 0.80 | 1.50863 | 64.00 | FILTER OR THE LIKE |
| 30 | ∞ | | | | |

In the table 3, asterisk indicates that surface is aspheric.

Aspheric Coefficients

| | | | | |
|---|---|---|---|---|
| 2 | $A4 = -2.44351E^{-5}$ | $A6 = -1.70264E^{-7}$ | $A8 = 5.80282E^{-10}$ | $A10 = -1.06209E^{-11}$ |
| 13 | $A4 = -4.81676E^{-5}$ | $A6 = 1.30940E^{-6}$ | $A8 = -9.98353E^{-8}$ | $A10 = 3.05466E^{-9}$ |
| 18 | $A4 = 1.22175E^{-5}$ | $A6 = 1.12063E^{-6}$ | $A8 = -1.60465E^{-8}$ | $A10 = 5.54309E^{-10}$ |
| 24 | $A4 = 2.05107E^{-4}$ | $A6 = -1.58339E^{-6}$ | $A8 = -1.43245E^{-8}$ | $A10 = -3.00992E^{-9}$ |
| 25 | $A4 = -1.94127E^{-4}$ | $A6 = -4.18777E^{-5}$ | $A8 = 2.23761E^{-6}$ | $A10 = -9.29713E^{-8}$ |
| 27 | $A4 = 5.40128E^{-5}$ | $A6 = -6.39869E^{-6}$ | $A8 = 1.34992E^{-6}$ | $A10 = -2.52983E^{-8}$ |

Table 4 shows variable interval data A to E during a change of zoom ratio according to the second embodiment. During the change of zoom ratio, the interval D11 (A) on the axis between the first and second lens groups I, II, that D16(B) between the second lens group II and the diaphragm D, that D17 (C) between the diaphragm D and the third lens group III, that D24(D) between the third and fourth lens groups III, IV, and that D26 (E) between the fourth and fifth lens groups IV, V are variable.

TABLE 4

| | Wide | Mean | Tele |
|---|---|---|---|
| f | 5.20 | 13.49 | 34.98 |
| F-value | 3.51 | 4.98 | 5.50 |
| ω | 40.43 | 16.83 | 6.83 |
| A | 0.57 | 8.70 | 13.64 |
| B | 13.57 | 5.44 | 0.50 |
| C | 11.75 | 7.23 | 0.50 |
| D | 5.74 | 6.62 | 9.04 |
| E | 0.80 | 4.44 | 8.75 | diaphragm diameter Wide: 2.5 mm Mean: 2.5 mm Tele: 3.8 mm

In the table 4 Wide denotes short focus end, Mean denotes an intermediate focal length, and Tele denotes a long focus end. The unit of the values is mm.

The zoom lens 10 according to the second embodiment of the present invention is configured to satisfy the following conditions (1) to (3):

$$0.2 < rI2/rI1 < 0.8 \quad (1)$$

$$2.0 < |fI12|/fw < 6.0 \quad (2)$$

$$0.05 < fI1/fI2 < 0.8 \quad (3)$$

where rI1 denotes a curvature radius of an object side face of the negative meniscus lens of the first lens group I and rI2 denotes a curvature radius of an image side face thereof, fI12 denotes a combined focal length of the two negative lenses of the first lens group I and fw denotes a total focal length of all of the lens groups at the short focus end, and fI1 denotes a focal length of the first negative lens on the object side and fI2 denotes that of the second negative lens on the image side.

Values of the respective parameters in the conditions (1) to (3) are as follows:

fI12=−20.258
fI1=−22.758
fI2=−241.310
rI2/rI1=0.335
|fI12|/fw=3.896
fI1/fI2=0.094

Figure 8:
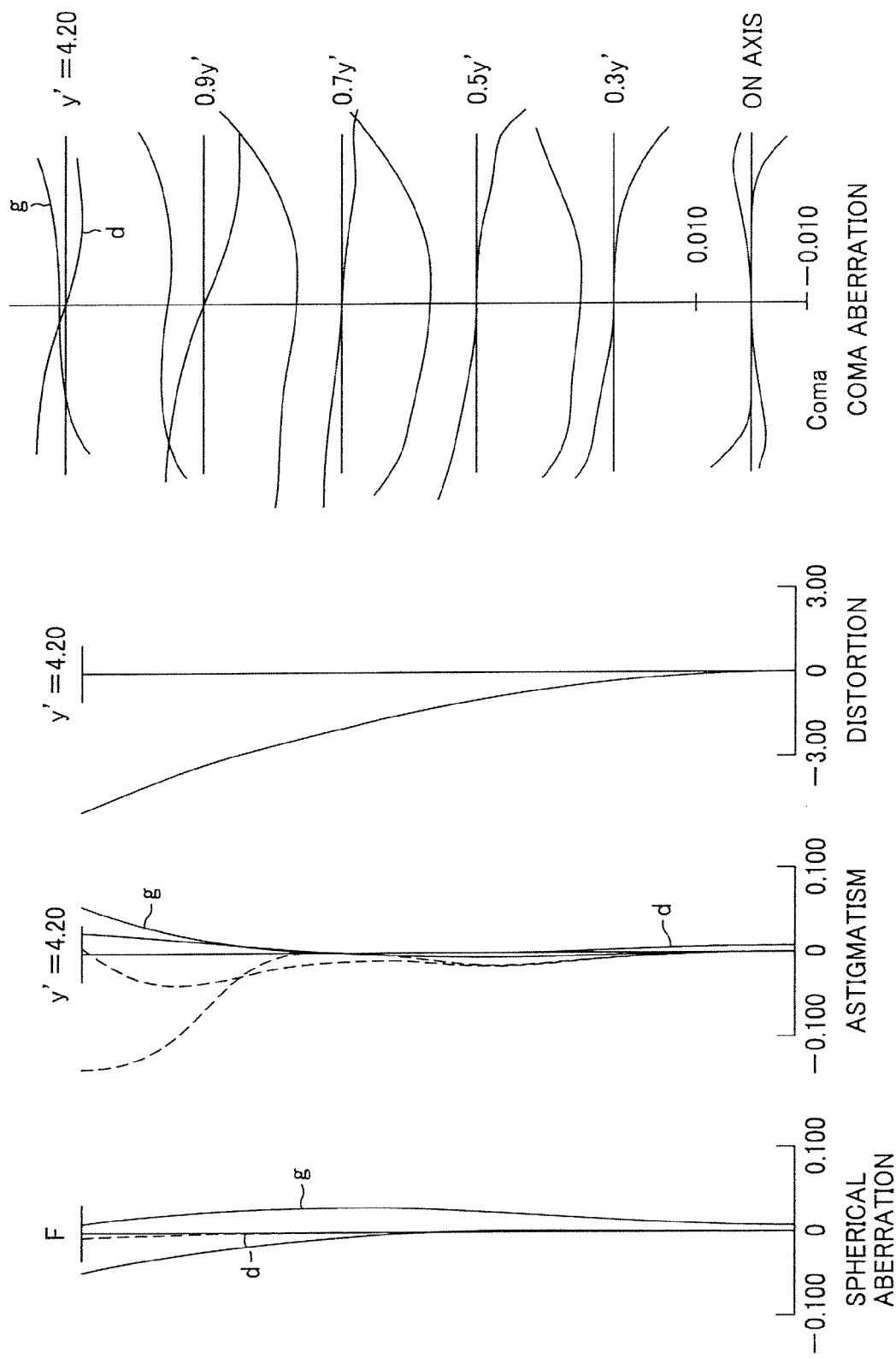
FIG. 8 shows aberration curves at the short focus end of the zoom lens 10 according to the second embodiment.
Figure 9:
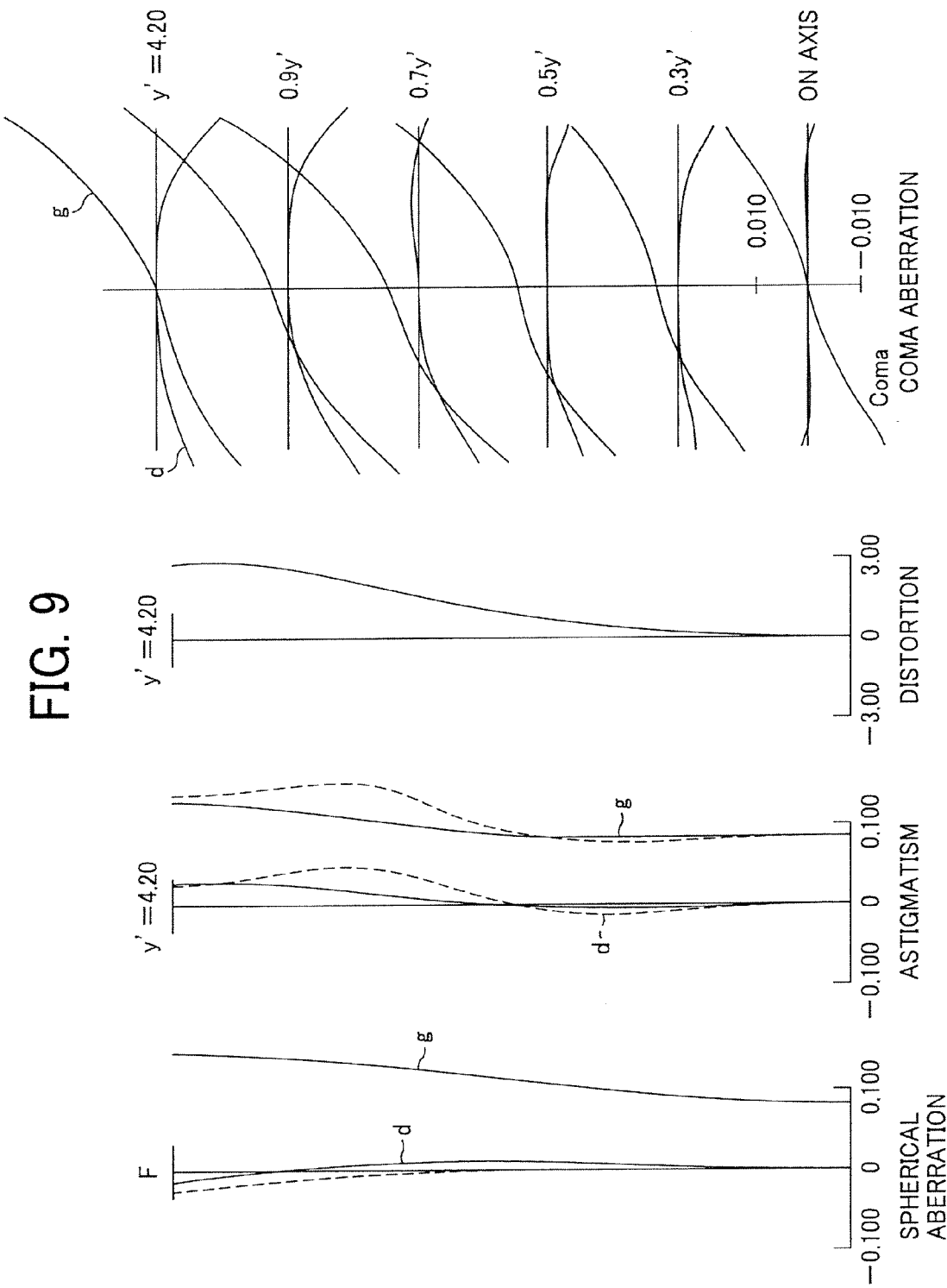
FIG. 9 shows aberration curves in the intermediate focal length of the zoom lens 10 according to the second embodiment.
Figure 10:
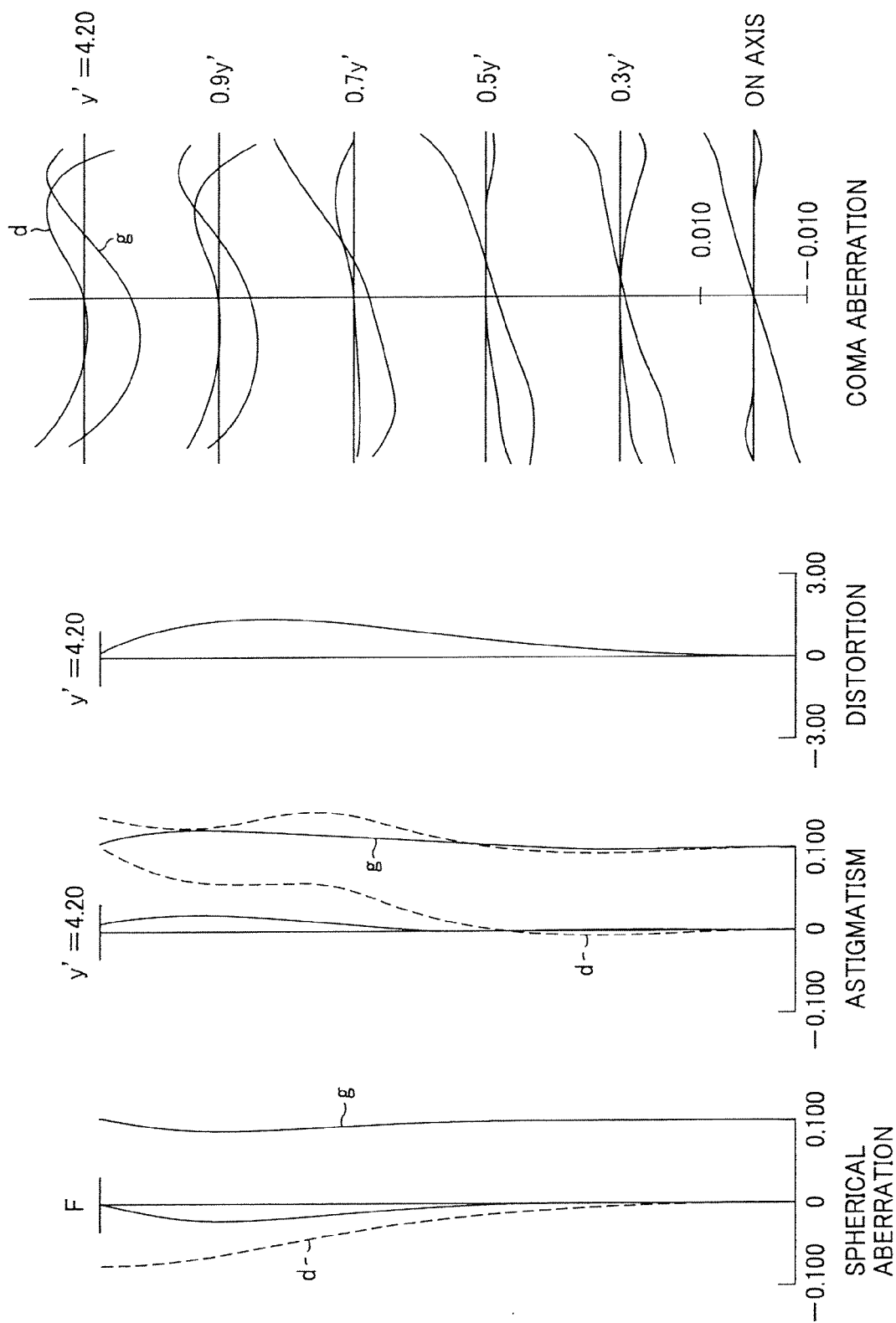
FIG. 10 shows aberration curves at the long focus end of the zoom lens 10 according to the second embodiment.

FIGS. 8 to 10 show aberrations of the zoom lens 10 according to the second embodiment at the short focus end, in the intermediate focal length, and at the long focus end, respectively. In the drawings, d denotes a D line and g denotes a G line. In the spherical aberration, the broken line indicates sine condition, in astigmatism, the solid line indicates sagittal image plane and the broken line indicates meridional image plane.

THIRD EXAMPLE

FIG. 3 shows configuration of the zoom lens 10 according to the third embodiment and how the respective lens groups move in accordance with a change of zoom ratio. In FIG. 3, L1 represents a first lens, L2 represents a second lens, L3 represents a third lens, L4 represents a fourth lens, L5 represents a fifth lens, L6 represents a sixth lens, L7 represents a seventh lens, L8 represents an eighth lens, L9 represents a ninth lens, L10 represents a 10$^{th}$ lens, L11 represents an 11$^{th}$ lens, L12 represents a 12$^{th}$ lens, and L13 represents a 13$^{th}$ lens.

The following table 5 shows specific data on the first to 13$^{th}$ lenses L1 to L13 of the first to fifth lens group I to V.

TABLE 5

| Si | Ri | Di | Ni | vi | GLASS |
|---|---|---|---|---|---|
| 1 | 49.999 | 1.03 | 1.90200 | 25.10 | LNBH54(OHARA) |
| 2* | 15.938 | 2.18 | | | |
| 3 | 40.006 | 1.01 | 1.80518 | 25.42 | STIH6(OHARA) |
| 4 | 26.005 | 1.84 | | | |
| 5 | ∞ | 7.90 | 1.88300 | 40.76 | SLAH58(OHARA) |
| 6 | ∞ | 7.90 | 1.88300 | 40.76 | SLAH58(OHARA) |
| 7 | ∞ | 0.20 | | | |
| 8 | 51.777 | 2.72 | 1.49700 | 81.54 | SFPL51(OHARA) |
| 9 | −25.541 | 0.25 | | | |
| 10 | 18.541 | 2.35 | 1.51633 | 64.14 | SBSL7(OHARA) |
| 11 | −317.100 | VARIABLE(A) | | | |
| 12 | −90.324 | 0.99 | 1.80610 | 40.88 | LLAH53(OHARA) |
| 13* | 7.978 | 1.67 | | | |
| 14 | −18.935 | 1.03 | 1.49700 | 81.54 | SFPL51(OHARA) |
| 15 | 11.569 | 1.75 | 1.84666 | 23.78 | STIH53(OHARA) |
| 16 | −136.666 | VARIABLE(B) | | | |
| 17 | (DIAPHGRAM) | VARIABLE(C) | | | |
| 18* | 9.831 | 2.36 | 1.73077 | 40.51 | LLAM69(OHARA) |
| 19 | 72.064 | 2.67 | | | |
| 20 | 11.779 | 3.23 | 1.48749 | 70.24 | SFSL5(OHARA) |
| 21 | −7.447 | 1.00 | 1.84666 | 23.78 | STIH53(OHARA) |
| 22 | 47.933 | 5.74 | | | |
| 23 | 6.887 | 1.68 | 1.55880 | 62.56 | LPHL2(OHARA) |
| 24* | 12.535 | VARIABLE(D) | | | |
| 25* | −7.641 | 1.00 | 1.67790 | 54.89 | LLAL12(OHARA) |
| 26 | −39.003 | VARIABLE(E) | | | |
| 27* | 14.896 | 2.23 | 1.51633 | 64.06 | LBSL7(OHARA) |
| 28 | −42.319 | 0.50 | | | |
| 29 | ∞ | 0.80 | 1.50863 | 64.00 | FILTER OR THE LIKE |
| 30 | ∞ | | | | |

In the table 5, asterisk indicates that surface is aspheric.

Aspheric Coefficient

| | | | | |
|---|---|---|---|---|
| 2 | $A4 = -7.16539E^{-6}$ | $A6 = -7.37282E^{-8}$ | $A8 = 7.42508E^{-10}$ | $A10 = -1.53844E^{-12}$ |
| 13 | $A4 = -6.46477E^{-5}$ | $A6 = -8.84609E^{-7}$ | $A8 = 2.76634E^{-8}$ | $A10 = -1.30803E^{-9}$ |
| 18 | $A4 = 2.55354E^{-6}$ | $A6 = 9.80232E^{-7}$ | $A8 = -1.16168E^{-8}$ | $A10 = 4.48234E^{-10}$ |
| 24 | $A4 = 3.28489E^{-4}$ | $A6 = -1.24154E^{-6}$ | $A8 = 2.17789E^{-7}$ | $A10 = -2.66825E^{-9}$ |
| 25 | $A4 = -4.38533E^{-4}$ | $A6 = -5.78256E^{-5}$ | $A8 = 4.07733E^{-6}$ | $A10 = -7.10906E^{-8}$ |
| 27 | $A4 = 4.26696E^{-5}$ | $A6 = 1.25849E^{-5}$ | $A8 = 3.68455E^{-7}$ | $A10 = -1.57350E^{-8}$ |

Table 6 shows variable interval data A to E during a change of zoom ratio according to the third embodiment. During the change of zoom ratio, the interval D11(A) of lens faces on the axis between the first and second lens groups I, II, that D16(B) between the second lens group II and the diaphragm D, that D17(C) between the diaphragm D and the third lens group III, that D24(D) between the third and fourth lens groups III, IV, and that D26(E) between the fourth and fifth lens groups IV, V are variable.

TABLE 6

| | Wide | Mean | Tele |
|---|---|---|---|
| f | 5.21 | 13.51 | 35.02 |
| F-value | 3.48 | 4.79 | 5.40 |
| ω | 40.41 | 16.78 | 6.77 |
| A | 0.55 | 8.86 | 13.34 |
| B | 13.29 | 4.98 | 0.50 |
| C | 12.22 | 7.80 | 0.50 |
| D | 3.01 | 4.29 | 7.99 |
| E | 0.98 | 4.12 | 7.72 | diaphragm diameter Wide: 2.5 mm Mean: 2.5 mm Tele: 3.8 mm

In the table 6 Wide denotes short focus end, Mean denotes an intermediate focal length, and Tele denotes a long focus end. The unit of the values is mm.

The zoom lens 10 according to the third embodiment of the present invention is configured to satisfy the following conditions (1) to (3):

$$0.2 < rI2/rI1 < 0.8 \tag{1}$$

$$2.0 < |fI12|/fw < 6.0 \tag{2}$$

$$0.05 < fI1/fI2 < 0.8 \tag{3}$$

where rI1 denotes a curvature radius of an object side face of the negative meniscus lens of the first lens group I and rI2 denotes a curvature radius of an image side face thereof, fI12 denotes a combined focal length of the two negative lenses of the first lens group I and fw denotes a total focal length of all of the lens groups at the short focus end, and fI1 denotes a focal length of the first negative lens on the object side and fI2 denotes that of the second negative lens on the image side.

Values of the respective parameters in the conditions (1) to (3) are as follows:

fl12=−20.035
fl1=−26.315
fl2=−95.353
rl2/rl1=0.319
|fl12|/fw=3.848
fl1/fl2=0.276

Figure 11:
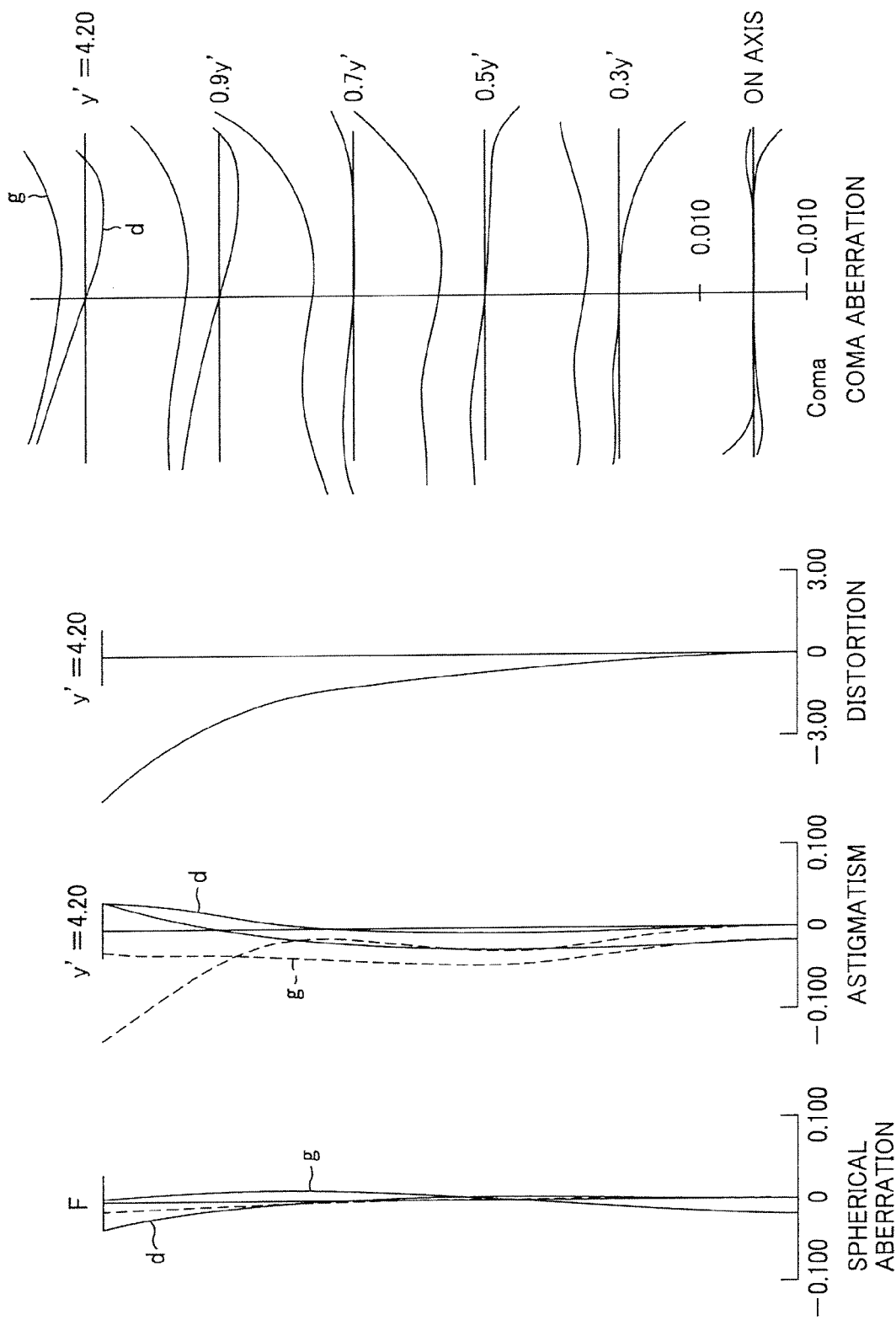
FIG. 11 shows aberration curves at the short focus end of the zoom lens 10 according to the third embodiment.
Figure 13:
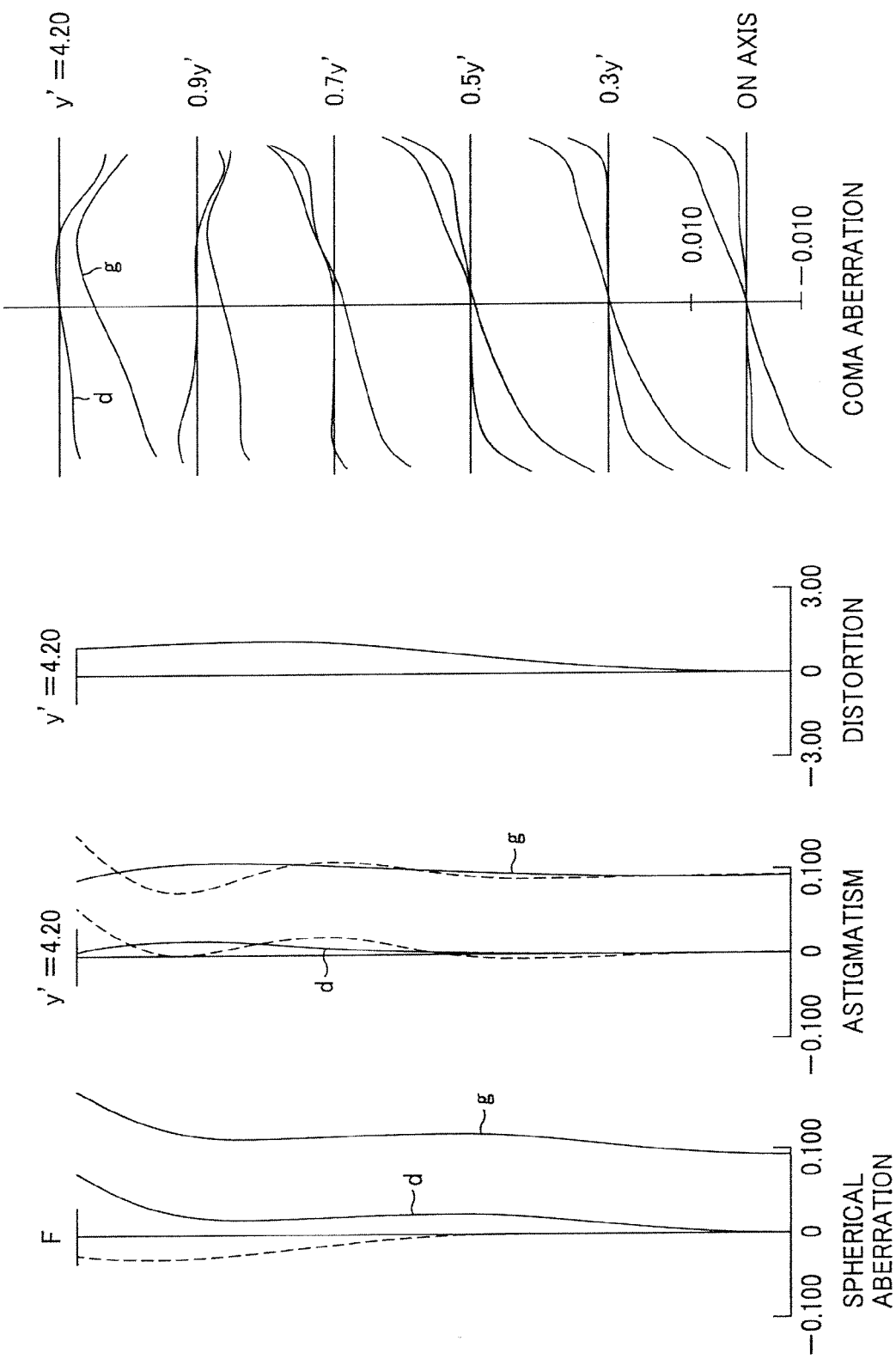
FIG. 13 shows aberration curves at the long focus end of the zoom lens 10 according to the third embodiment.

FIGS. 11 to 13 show aberrations of the zoom lens 10 according to the third embodiment at the short focus end, in the intermediate focal length, and at the long focus end, respectively. In the drawings, d denotes a D line and g denotes a G line. In the spherical aberration, the broken line indicates sine condition, in the astigmatism, the solid line indicates sagittal image plane and the broken line indicates meridional image plane.

FOURTH EXAMPLE

FIG. 4 shows configuration of the zoom lens 10 according to the fourth embodiment and how the respective lens groups move in accordance with a change of zoom ratio. In FIG. 4, L1 represents a first lens, L2 represents a second lens, L3 represents a third lens, L4 represents a fourth lens, L5 represents a fifth lens, L6 represents a sixth lens, L7 represents a seventh lens, L8 represents an eighth lens, L9 represents a ninth lens, L10 represents a $10^{th}$ lens, L11 represents an $11^{th}$ lens, L12 represents a $12^{th}$ lens, and L13 represents a $13^{th}$ lens.

The following table 7 shows specific data on the first to $13^{th}$ lenses L1 to L13 of the first to fifth lens group I to V.

TABLE 7

| Si | Ri | Di | Ni | vi | GLASS |
|---|---|---|---|---|---|
| 1 | 22.112 | 1.00 | 1.80518 | 25.42 | STIH6(OHARA) |
| 2 | 11.937 | 3.55 | | | |
| 3 | 28.180 | 1.00 | 1.92286 | 18.90 | SNPH2(OHARA) |
| 4 | 20.571 | 2.35 | | | |
| 5 | ∞ | 7.90 | 1.88300 | 40.76 | SLAH58(OHARA) |
| 6 | ∞ | 7.90 | 1.88300 | 40.76 | SLAH58(OHARA) |
| 7 | ∞ | 0.20 | | | |
| 8 | 34.814 | 2.91 | 1.49700 | 81.54 | SFPL51(OHARA) |
| 9 | −23.006 | 0.20 | | | |
| 10 | 31.063 | 1.94 | 1.51823 | 58.90 | SNSL3(OHARA) |
| 11 | −68.951 | VARIABLE(A) | | | |
| 12 | −46.892 | 1.00 | 1.80610 | 40.88 | LLAH53(OHARA) |
| 13* | 8.209 | 1.57 | | | |
| 14 | −14.727 | 1.00 | 1.49700 | 81.54 | SFPL51(OHARA) |
| 15 | 12.293 | 1.66 | 1.84666 | 23.78 | STIH53(OHARA) |
| 16 | −70.583 | VARIABLE(B) | | | |
| 17 | (DIAPHGRAM) | VARIABLE(C) | | | |
| 18* | 9.985 | 2.51 | 1.73077 | 40.51 | LLAM69(OHARA) |
| 19 | 92.101 | 2.47 | | | |
| 20 | 12.287 | 3.33 | 1.48749 | 70.24 | SFSL5(OHARA) |
| 21 | −7.407 | 1.00 | 1.84666 | 23.78 | STIH53(OHARA) |
| 22 | 60.449 | 5.40 | | | |
| 23 | 8.000 | 1.99 | 1.51633 | 64.06 | LBSL7(OHARA) |
| 24* | 16.196 | VARIABLE(D) | | | |
| 25* | −7.796 | 1.00 | 1.73077 | 40.51 | LLAM69(OHARA) |
| 26 | −33.009 | VARIABLE(E) | | | |
| 27* | 10.022 | 2.36 | 1.51633 | 64.06 | LBSL7(OHARA) |
| 28 | 87.079 | 0.50 | | | |
| 29 | ∞ | 0.80 | 1.50863 | 64.00 | FILTER OR THE LIKE |
| 30 | ∞ | | | | |

In the table 7, asterisk indicates that surface is aspheric.

| Aspheric Coefficients | | | |
|---|---|---|---|
| 13 $A4 = -6.30716E^{-5}$ | $A6 = -1.82831E^{-6}$ | $A8 = 1.17015E^{-7}$ | $A10 = -2.94161E^{-9}$ |
| 18 $A4 = 7.89812E^{-7}$ | $A6 = 1.01261E^{-6}$ | $A8 = -1.29483E^{-8}$ | $A10 = 4.65629E^{-10}$ |
| 24 $A4 = 3.21160E^{-4}$ | $A6 = -4.86415E^{-6}$ | $A8 = 4.55191E^{-7}$ | $A10 = -1.19329E^{-8}$ |
| 25 $A4 = -1.53264E^{-4}$ | $A6 = -4.25817E^{-5}$ | $A8 = 2.85758E^{-6}$ | $A10 = -6.61343E^{-8}$ |
| 27 $A4 = -1.30967E^{-4}$ | $A6 = 1.36879E^{-5}$ | $A8 = 1.55211E^{-7}$ | $A10 = -5.04875E^{-9}$ |

Table 8 shows variable interval data A to E during a change of zoom ratio according to the fourth embodiment. During the change of zoom ratio, the interval D11(A) on the axis between the first and second lens groups I, II, that D16(B) between the second lens group II and the diaphragm D, that D17(C) between the diaphragm D and the third lens group III, that D24(D) between the third and fourth lens groups III, IV, and that D26(E) between the fourth and fifth lens groups IV, V are variable.

TABLE 8

|  | Wide | Mean | Tele |
|---|---|---|---|
| f | 5.20 | 13.50 | 34.99 |
| F-value | 3.24 | 4.70 | 5.39 |
| ω | 40.39 | 16.78 | 6.69 |
| A | 0.50 | 7.30 | 11.46 |
| B | 11.46 | 4.66 | 0.50 |
| C | 12.58 | 7.62 | 0.50 |
| D | 3.00 | 4.10 | 8.00 |
| E | 1.00 | 4.86 | 8.08 |

Diaphragm diameter Wide: 2.5 mm Mean: 2.5 mm Tele: 3.7 mm

In the table 8 Wide denotes short focus end, Mean denotes an intermediate focal length, and Tele denotes a long focus end. The unit of the values is mm.

The zoom lens 10 according to the fourth embodiment of the present invention is configured to satisfy the following conditions (1) to (3):

$$0.2 < rI2/rI1 < 0.8 \quad (1)$$

$$2.0 < |fI12|/fw < 6.0 \quad (2)$$

$$0.05 < fI1/fI2 < 0.8 \quad (3)$$

where rI1 denotes a curvature radius of an object side face of the negative meniscus lens of the first lens group I and rI2 denotes a curvature radius of an image side face thereof, fI12 denotes a combined focal length of the two negative lenses of the first lens group I and fw denotes a total focal length of all of the lens groups at the short focus end, and fI1 denotes a focal length of the first negative lens on the object side and fI2 denotes that of the second negative lens on the image side.

Values of the respective parameters in the conditions (1) to (3) are as follows:

fI12=−23.427
fI1=−33.695
fI2=−88.111
rI2/rI1=0.540
|fI12|/fw=4.506
fI1/fI2=0.382

Figure 14:
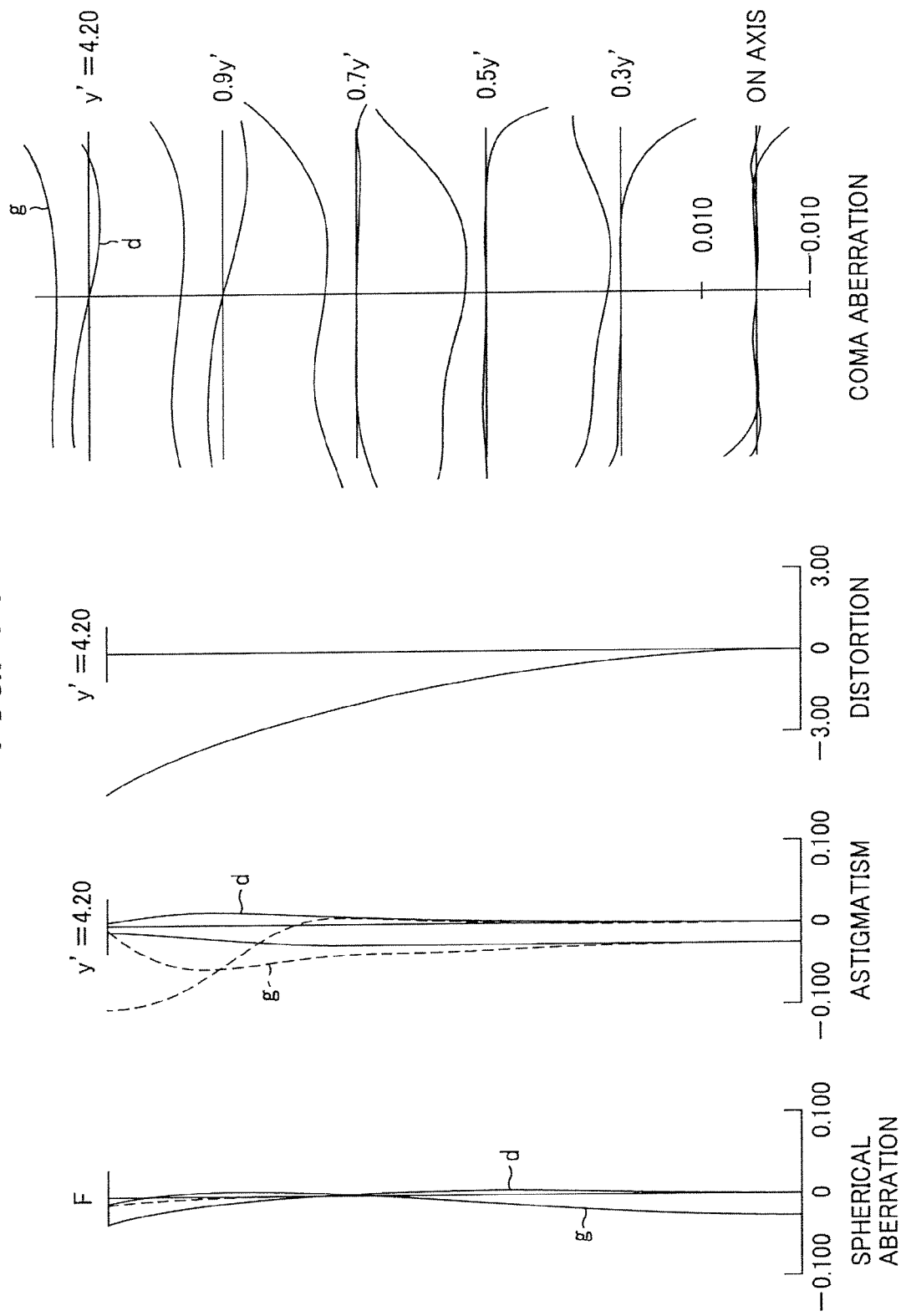
FIG. 14 shows aberration curves at the short focus end of the zoom lens 10 according to the fourth embodiment.
Figure 15:
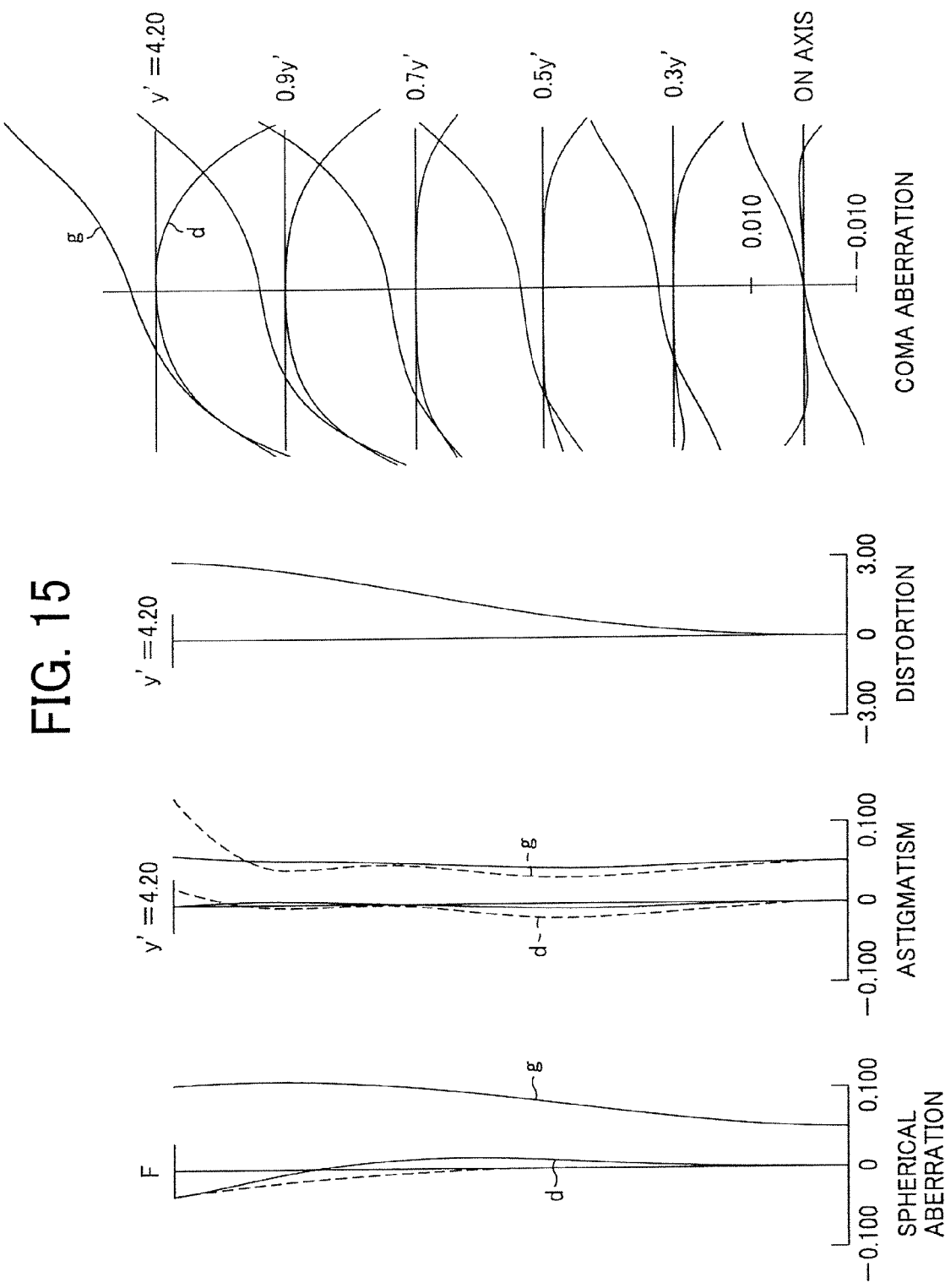
FIG. 15 shows aberration curves in the intermediate focal length of the zoom lens 10 according to the fourth embodiment.
Figure 16:
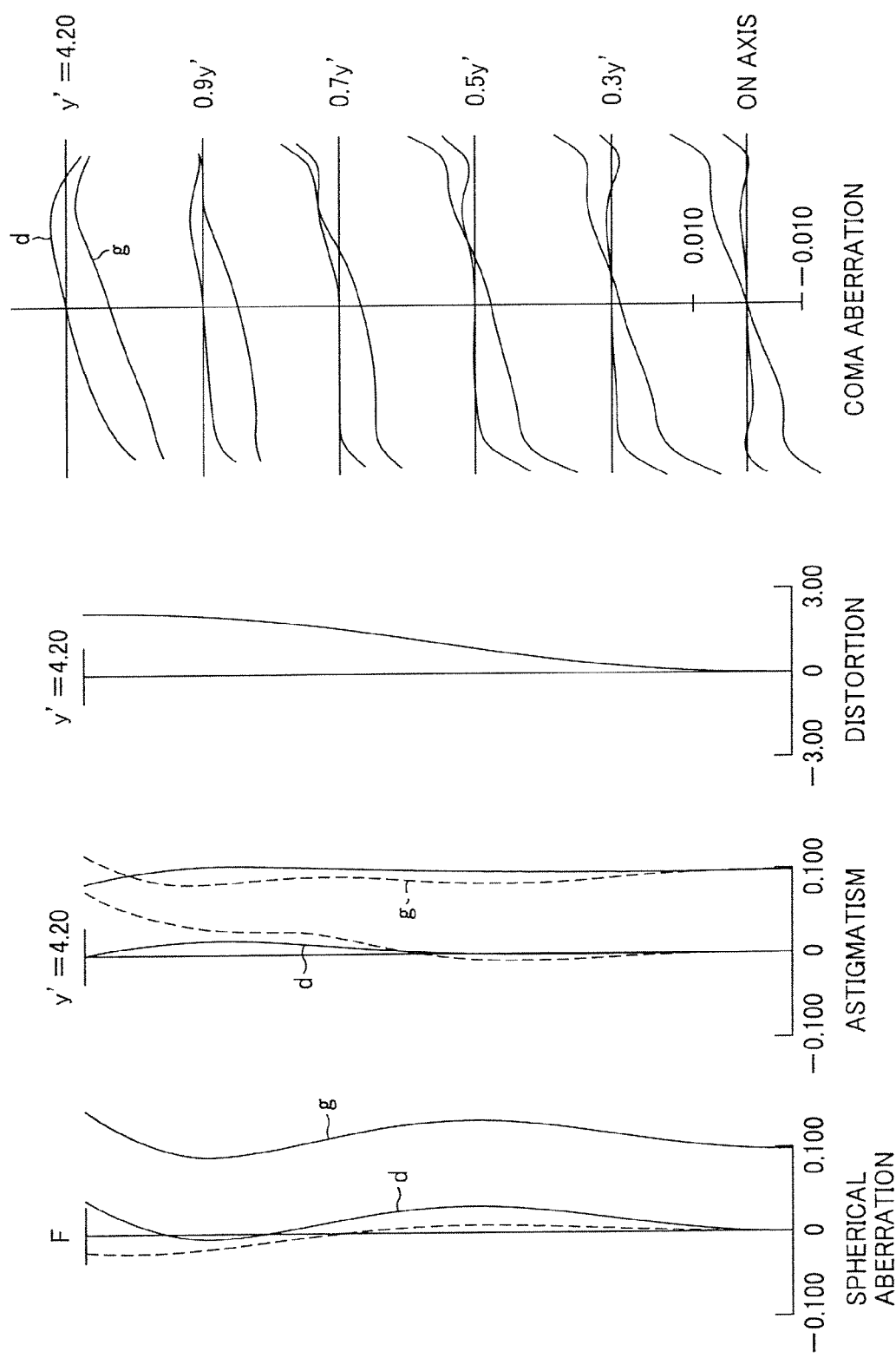
FIG. 16 shows aberration curves at the long focus end of the zoom lens 10 according to the fourth embodiment.

FIGS. 14 to 16 show aberrations of the fourth example of the zoom lens 10 at the short focus end, intermediate focal length, and long focus end, respectively. In the spherical aberration, the broken line indicates sine condition, in the astigmatism, the solid line indicates sagittal image plane and the broken line indicates meridional image plane.

According to the present invention, the zoom lens 10 is configured to have the two, first and second negative lenses on the object side of the reflective optical element P, this allows the first and second negative lenses to share great negative power required therefore and further leads to effectively reducing the size of the reflective optical element P, achieving a zoom lens with smaller size, wider angle, and higher zoom ratio. The first and second negative lenses on the object side of the reflective optical element are also advantageous in terms of manufacture errors.

According to the present invention, the fifth lens group V having a positive focal length is provided on the image side of the fourth lens group IV. This can distance an exit pupil position away from the imaging plane. Further, the fifth lens group V can correct aberration, especially curvature of image plane which the first to fourth lens groups cannot correct sufficiently. Moreover, the fifth lens group V according to the present invention is configured to be fixed during a change of the zoom ratio. This enables a simple drive mechanism for lens movements.

Further, according to the present invention, to improve optical performance of the zoom lens, one of the two negative lenses on the object side of reflective optical element is preferably a negative meniscus lens with a convex face on the object side. With the meniscus lens having a concave face on the object side, it is difficult to correct off-axis aberration at the short focus end since incidence angles of off-axial light beams onto the object side of thereof is increased. Also, the other of the two negative lenses closer to the reflective optical element is preferably a negative meniscus lens, which leads to heightening performance of the zoom lens 10 effectively.

According to the present invention, the first lens group I is configured to include two positive lenses on the image side of the reflective optical element. The number of the positive lenses is preferably two or more. This is because with only one positive lens, the one positive lens needs to exhibit very large positive power so that it is made difficult to properly correct aberration of an off-axial light beam passing through a high position of the lens at the short focus end and of an axial marginal light beam passing through a high position of the lens at the long focus end.

The zoom lens 10 according to the first to fourth embodiments of the present invention is configured to satisfy the following conditions (1) to (3):

$$0.2 < rI2/rI1 < 0.8 \quad (1)$$

$$2.0 < |fI12|/fw < 6.0 \quad (2)$$

$$0.05 < fI1/fI2 < 0.8 \quad (3)$$

where rI1 denotes a curvature radius of an object side face of the negative meniscus lens of the first lens group I and rI2 denotes a curvature radius of an image side face thereof, fI12 denotes a combined focal length of the two negative lenses of the first lens group I and fw denotes a total focal length of all of the lens groups at the short focus end, and fI1 denotes a focal length of the first negative lens on the object side and fI2 denotes that of the second negative lens on the image side.

When rI2/rI1 is lower than the lower limit value in the condition (1), the curvature of the convex face of the negative meniscus lens will be larger and the incidence angle of the off-axial light beam thereon will be also much larger. This makes it difficult to correct off-axial aberration at the short focus end. In contrast, when rI2/rI1 is higher than the upper limit value, the negative power of the negative meniscus lens will be too small, requiring two negative lenses in larger size. Also, one of the two negative lenses on the side of the reflective optical element is required to have a very large negative power. Because of this, it becomes difficult to properly correct aberration of an off-axial light beam passing through a high position of the lens at the short focus end and of an axial marginal light beam passing through a high position of the lens at the long focus end.

When |fI12|/fw is lower than the lower limit value in the condition (2), one of the two negative lenses on the object side of the reflective optical element will have too large negative power. This also make it difficult to properly correct aberration of an off-axial light beam passing through a high position of the lens at the short focus end and of an axial marginal light beam passing through a high position of the lens at the long focus end.

In contrast, when |fI12|/fw is higher than the upper limit value in the condition (2), the first negative lens in larger size will be needed and the off-axial light beam will pass through a higher position thereof at the short focus end, making aberration correction difficult. This further makes it impossible to set a large distance from the first negative lens to the reflective optical element to reduce the size of the reflective optical element.

Further, when fI/fI2 is lower than the lower limit value in the condition (3), the negative power of the second negative lens closer to the reflective optical element will be too low, so that it cannot function to correct aberration together with the first negative lens. This also make it difficult to properly correct aberration of an off-axial light beam passing through a high position of the lens at the short focus end and of an axial marginal light beam passing through a high position of the lens at the long focus end.

In contrast, when fI1/fI2 is over the upper limit value in the condition (3), the first negative lens in larger size will be needed and the off-axial light beam will pass through a higher position thereof at the short focus end, making aberration correction difficult.

As described above, all the zoom lenses in the first to fourth examples show excellent performance, satisfy the conditions (1) to (3) and achieve the zoom ratio of 5 or more and half the field of view of 38 degrees or more.

As described above, the present invention can provide a novel zoom lens in compact size with excellent performance which achieves the zoom ratio of 5 or more and half the field of view of 38 degrees or more as well as a novel camera device in compact size which incorporates this zoom lens and produces high-quality images.

Although the present invention has been described in terns of exemplary embodiments, it is not limited thereto. It should be appreciated that variations may be made in the embodiments described by those skilled in the art without departing from the scope of the present invention as defined by the following claims.

What is claimed is:

1. A zoom lens comprising:
   a first lens group having a positive focal length;
   a second lens group having a negative focal length;
   a third lens group having a positive focal length;
   a fourth lens group having a negative focal length, the first to fourth lens groups arranged in order from an object side to an image side; and
   a diaphragm disposed between the second and third lens groups, wherein:
   during a change of zoom ratio from a short focus end to a long focus end, the first to fourth lens groups are configured to move so that an interval between the first and second lens groups increases, an interval between the second and third lens groups decreases, and an interval between the third and fourth lens groups increases; and
   the first lens group comprises a first negative lens, a second negative lens, a reflective optical element, and at least one positive lens arranged in order from the object side to the image side;
   the reflective optical element is configured to bend an optical path of an incident light beam in the first lens group.

2. A zoom lens according to claim 1, further comprising a fifth lens group on the image side of the fourth lens group and having a positive focal length.

3. A zoom lens according to claim 1, wherein the first negative lens of the first lens group closest to an object is a negative meniscus lens with a convex face on the object side.

4. A zoom lens according to claim 3, wherein the negative meniscus lens of the first lens group is configured to have such a lens characteristic as to satisfy the following condition (1):

$$0.2 < rI2/rI1 < 0.8$$

where rI1 denotes a curvature radius of an object side face of the negative meniscus lens and rI2 denotes a curvature radius of an image side face thereof.

5. A zoom lens according to claim 1, wherein the first lens group comprises two positive lenses on the image side of the reflective optical element.

6. A zoom lens according to claim 1, wherein the first and second negative lenses of the first lens group are configured to have such a lens characteristic as to satisfy the following condition (2):

$$2.0 < |fI12|/fw < 6.0$$

where fI12 denotes a combined focal length of the two negative lenses and fw denotes a total focal length of all of the lens groups at the short focus end.

7. A zoom lens according to claim 1, wherein the first and second negative lenses of the first lens group are configured to have such a lens characteristic as to satisfy the following condition (3):

$$0.05 < fI1/fI2 < 0.8$$

where fI1 denotes a focal length of the first negative lens on the object side and fI2 denotes that of the second negative lens on the image side.

8. A zoom lens according to claim 1, wherein
   the first negative lens of the first lens group closer to the image side is a negative meniscus lens with a convex face on the object side.

9. A zoom lens according to claim 2, wherein the fifth lens group is fixed in a change of zoom ratio.

10. A zoom lens according to claim 1, wherein a zoom ratio of the zoom lens is 5 or more and a half field of view thereof is 38 degrees or more at the short focus end.

11. A camera device comprising the zoom lens according to claim 1 as a photographic lens.

12. A camera device according to claim 11, further comprising a function to convert a captured image into digital data.

* * * * *